United States Patent

Yoshida

[11] Patent Number: 5,524,493
[45] Date of Patent: Jun. 11, 1996

[54] ELECTROMAGNETIC FLOWMETER

[75] Inventor: Yutaka Yoshida, Aichi-Ken, Japan

[73] Assignee: Aichi Tokei Denki Co., Ltd., Aichi-ken, Japan

[21] Appl. No.: 418,460

[22] Filed: Apr. 7, 1995

Related U.S. Application Data

[60] Division of Ser. No. 231,727, Apr. 22, 1994, which is a continuation-in-part of Ser. No. 968,508, Oct. 29, 1992, abandoned, Ser. No. 39,407, Apr. 20, 1993, abandoned, and Ser. No. 39,433, Apr. 20, 1993, abandoned.

[30] Foreign Application Priority Data

| Sep. 3, 1991 | [JP] | Japan | 3-222939 |
| Sep. 3, 1991 | [JP] | Japan | 3-222940 |
| Dec. 18, 1991 | [JP] | Japan | 3-335050 |

[51] Int. Cl.⁶ ............................................. G01F 1/58
[52] U.S. Cl. .................................. 73/110; 73/861.16
[58] Field of Search ........................ 73/861.11, 861.12, 73/861.16, 861.17

[56] References Cited

U.S. PATENT DOCUMENTS

| 3,757,576 | 9/1973 | Rolff et al. | 73/861.17 |
| 3,991,612 | 11/1976 | Mannherz et al. | 73/861.17 |
| 5,018,391 | 5/1991 | Doll | 73/861.17 |
| 5,301,556 | 4/1994 | Nissen et al. | 73/861.15 |
| 5,351,554 | 10/1994 | Budminger | 73/861.17 |
| 5,375,475 | 12/1994 | Kiene et al. | 73/861.15 |

FOREIGN PATENT DOCUMENTS

| 0336615 | 10/1989 | European Pat. Off. . |
| 0555493 | 8/1993 | European Pat. Off. . |
| 0557529 | 9/1993 | European Pat. Off. . |
| 2068824 | 9/1971 | France . |
| 2063792 | 7/1972 | Germany . |
| 2856240 | 7/1980 | Germany . |
| 52-48356 | 10/1975 | Japan . |
| 59-230115 | 12/1984 | Japan . |
| 62-114317 U | 7/1987 | Japan . |
| 63-6420 | 1/1988 | Japan . |
| 1-292214 | 2/1990 | Japan . |
| 1292214 | 2/1990 | Japan . |

OTHER PUBLICATIONS

Patent Abstracts of Japan, vol. 9, No. 109 (P–355) May 14, 1985 & JP–A–59 230115 (Yamatake Honeywell) *abstract*.
Patent Abstracts of Japan, vol. 14, No. 76 (P–1005) Feb. 13, 1990 & JP–A–1292214 (Aichi Tokei) *abstract*.
Patent Abstrats of Japan, vol. 14, No. 76 (P–1005) Feb. 13, 1990 & JP–A–59 230 115 (Aichi Tokei).
Patent Abstracts of Japan, vol. 12, No. 303 (P–746) Sep. 19, 1986 & JP–A–63 075 620 (Kensetsusho Doboku Kenkyu Shocho).

*Primary Examiner*—Richard Chilcot
*Assistant Examiner*—Elizabeth L. Dougherty
*Attorney, Agent, or Firm*—Pollock, Vande Sande & Priddy

[57] ABSTRACT

An electromagnetic flow meter capable of measuring the flow of a fluid flowing through a conduit irrespective of whether the conduit is full with the fluid or not. A ratio of the output of a sensor disposed on the side of the conduit and obtained when a coil disposed above the conduit is energized to the output of the sensor obtained when a coil disposed below the conduit is energized is always a function of only the level of the fluid in the conduit. Therefore, if a first relationship between the ratio and the level of the fluid is beforehand obtained for a reference conduit, the level can be specified even if a gradient of the conduit changes. Since the level and flow are in a one-to-one relationship in the reference conduit, a second relationship between the sensor output and flow or level of the fluid obtained when the upper coil is energized, should beforehand be obtained. If the ratio is obtained for the measured conduit, the level of the fluid is determined. The flow in the reference conduit and the output at the level are obtained from the second relationship. Thus, the sensitivity=the output/the flow at that level is obtained. This sensitivity does not change as long as the level is constant. Thus, the sensitivity in the measured conduit is obtained. The flow of the fluid of interest is obtained by multiplying the sensitivity by the measured output for the measured conduit.

10 Claims, 33 Drawing Sheets

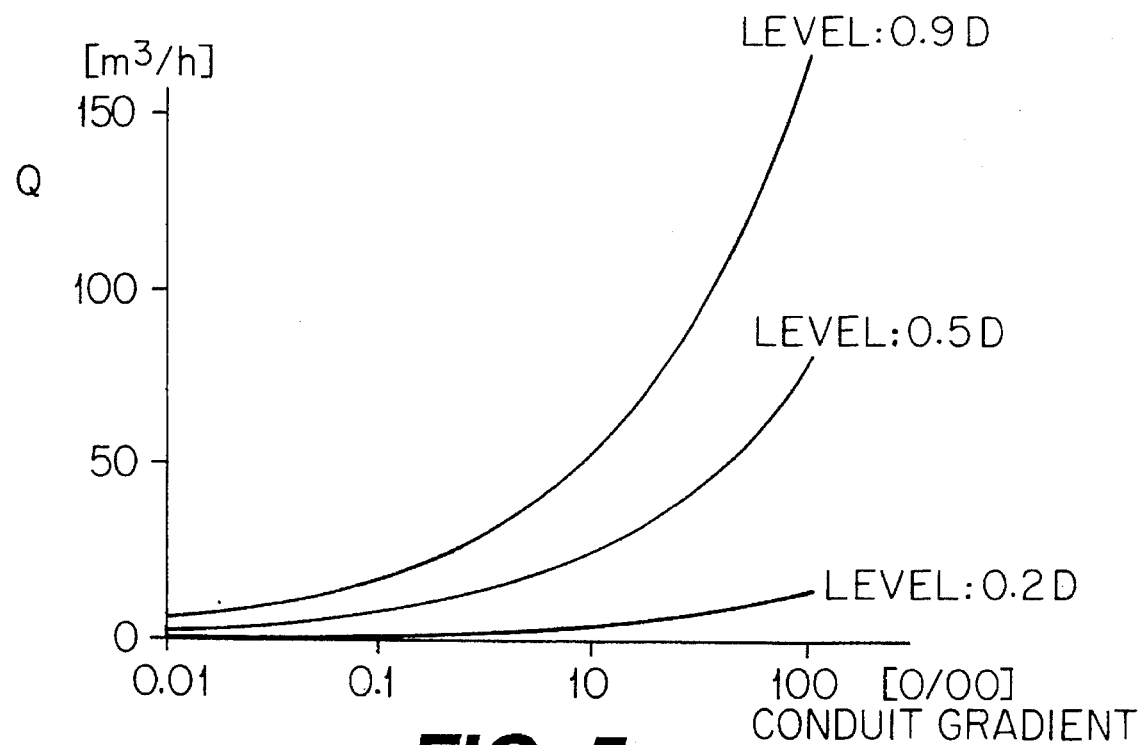
FIG. 5
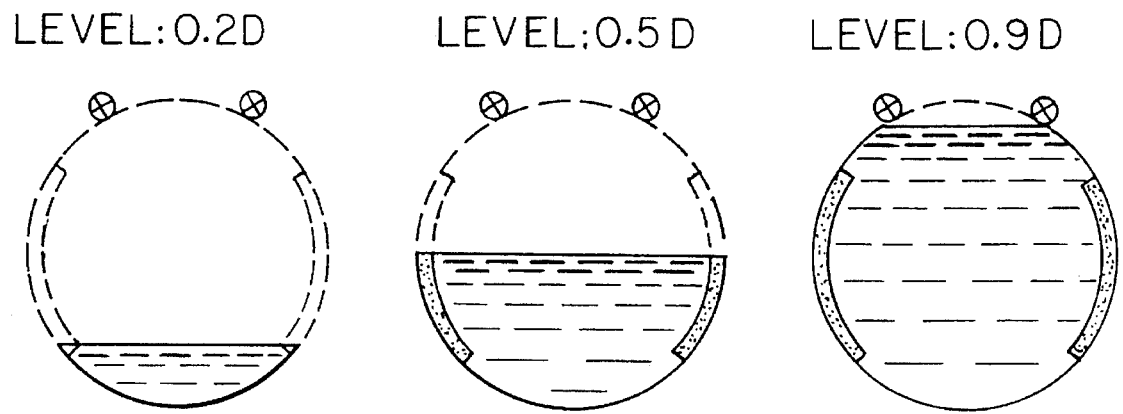
FIG. 6A  FIG. 6B  FIG. 6C

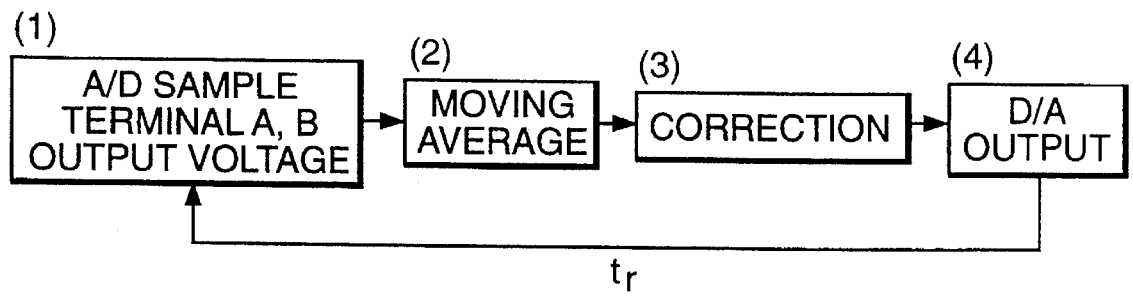
FIG. 26
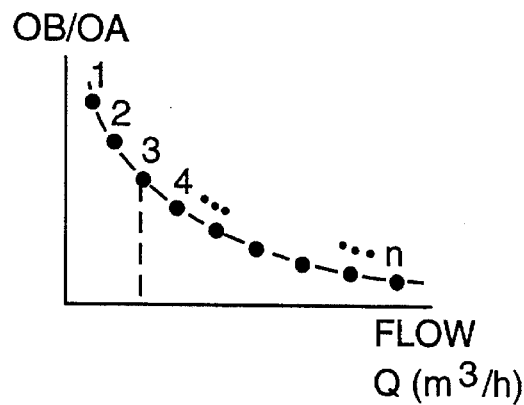
FIG. 27
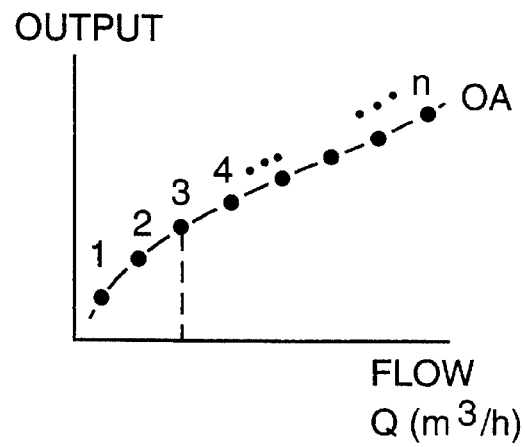
FIG. 28
| 1 | FLOW 1 | (10) |
|---|---|---|
| 2 | $OA_1$ | (01) |
| 3 | $OB_1/OA_1$ | (12) |
| 4 | FLOW 2 | (20) |
| 5 | $OA_2$ | (0.22) |
| 6 | $OB_2/OA_2$ | (6.9) |
| ⋮ | ⋮ | |
FIG. 29

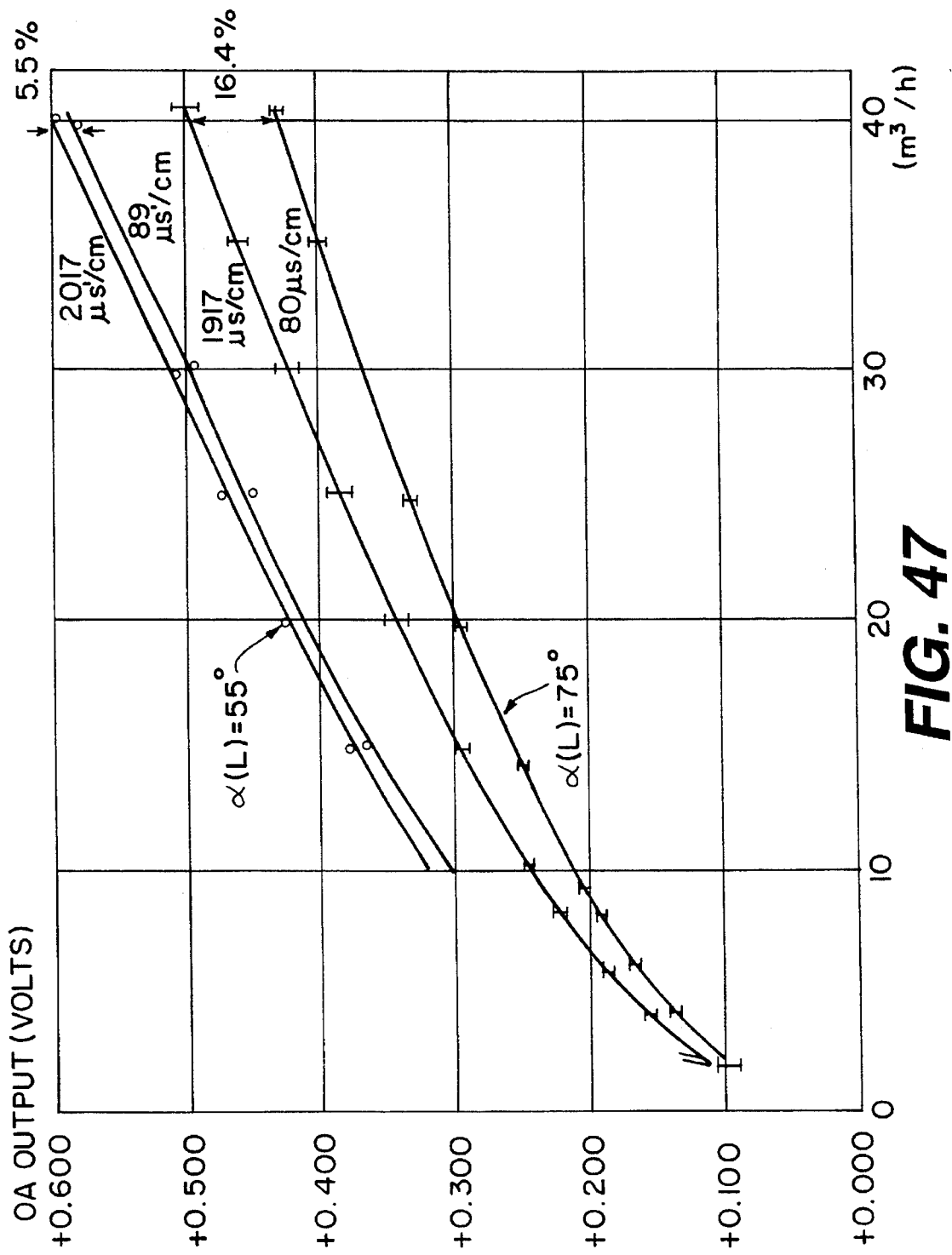

ELECTROMAGNETIC FLOWMETER

This is a divisional of Ser. No. 08/231,727, filed on Apr. 22, 1994, which is a Continuation-In-Part of U.S. applications Ser. No. 07/968,598 filed on Oct. 29, 1992, abandoned, Ser. No. 08/039,407 filed on Apr. 20, 1993, abandoned, and Ser. No. 08/039,433 filed on Apr. 20, 1993, abandoned.

BACKGROUND OF THE INVENTION

The present invention relates to electromagnetic flowmeters and more particularly to an electromagnetic flowmeter which measures the flow of a fluid which flows through a conduit, whether or not the conduit is full of the fluid.

Conventionally, an electromagnetic flowmeter is known which measures the flow of a fluid which flows through a conduit in a state where the conduit is full of a fluid. Murase and others have proposed an electromagnetic flowmeter which is composed of an exciting coil disposed above a conduit, a pair of electrodes disposed below the conduit and circuitry which controls those coils (JP-A-01-29224). According to this flowmeter, even if the conduit is not filled with a test fluid, the measurement of the flow of the fluid is theoretically possible.

Watanabe and others have proposed a detector which detects whether a conduit is full of a flowing fluid or not, the detector comprising a pair of coils each disposed above and below a conduit, a unit for selecting and driving one of these coils, a pair of electrodes disposed on the corresponding sides of the conduit, and circuitry which selects energization of a coil, as disclosed in JP-A-59-2302115.

There are three other methods which measure the flow of a fluid which flows through a conduit in a non-full state and in a non-electromagnetic manner as follows:

1. A level measuring system which measures the level of fluid in a conduit using an ultrasonic level meter and calculates an estimated flow using formulas;
2. A dam system for calculating the flow of a fluid in accordance with hydraulic formulas by measuring the level of the fluid at a dam provided intermediate a conduit through which the fluid flows; and
3. A level and flow rate measuring system for calculating the flow of a fluid by measuring the level of the fluid using ultrasonic waves or pressures and measuring the flow rate in an ultrasonic or electromagnetic manner.

SUMMARY OF THE INVENTION

It is an object of the present invention to provide an electromagnetic flowmeter which is capable of measuring the flow of a fluid in a conduit, whether or not the conduit is filled with the fluid.

It is another object of the present invention to provide an electromagnetic flowmeter having high accuracy.

It is a further object of the present invention to provide an electromagnetic flowmeter which is capable of measuring the flow of a fluid flowing through a conduit whose slope or gradient is unknown.

It is a further object of the present invention to provide an electromagnetic flowmeter which is capable of measuring the flow of a fluid flowing through a conduit whose slope is known.

It is a further object of the present invention to provide a novel device which measures the level of a fluid which flows through a conduit.

It is a further object of the present invention to provide an electromagnetic flowmeter which is capable of measuring the flow of a fluid through a conduit when the level of the fluid is known and the slope of the conduit is unknown.

It is a further object of the present invention to provide a method of achieving at least one of the above objects.

It is a still further object of the present invention to provide an exciting coil for achieving at least one of the above objects.

First, the principles of the present invention will be described below.

The electromagnetic flowmeter of this invention is composed of a pair of upper and lower exciting coils disposed above and below a conduit, a sensor which provides an output corresponding to the state of a test fluid which flows through the conduit when the respective coils are excited, and a control circuit which controls the excitation of the respective coils.

FIG. 1 shows the relationship between a flow Q and the output from the sensor disposed in a conduit having a known slope and a known diameter or a cross-sectional configuration. A curve OA in FIG. 1 represents a relationship (second relationship) obtained when the upper coil is excited while a curve OB represents a relationship obtained when the lower coil is excited. Since the slope and diameter of the conduit is known, the level h of the fluid is uniquely determined for the flow Q. The horizontal axis of FIG. 1 is scaled with botch flow Q and level h of the fluid. The level is indicated as a percentage of the level to the diameter D of the conduit.

FIG. 2 represents a relationship (first relationship) between a ratio $K(h)$ (first ratio) of curve OB to curve OA and level h.

As shown in FIG. 3, if a fluid which flows through a flow sensor of an electromagnetic flowmeter having a pair of electrodes 2 disposed across a circular cross-sectional conduit 1 and a saddle-shaped exciting coil 3A disposed on top of conduit 1 is maintained at a level (0.5 D) of half the diameter (inner diameter) D of the conduit 1, it has considered that the flowmeter is the same measuring conditions as a full-fluid flowmeter with a flow path having a cross-section equal to the lower half of the conduit. Therefore, the output OA from the electromagnetic flowmeter is represented by a straight line proportional to the flow, as shown in FIG. 4. The slope k of this line represents the sensitivity of a virtual full-fluid electromagnetic flowmeter. The sensitivity k is $k=OA/Q$ (second ratio) where Q is the flow. The sensitivity is normally constant in the full-fluid electromagnetic flowmeter, so that the sensitivity of the virtual full-fluid flowmeter is also constant as long as the level h is maintained constant. That is, the sensitivity k is a function of level h.

In this case, a magnetic flux density distribution BA due to upper coil 3A is considered to be constant. Generally, in a full-fluid electromagnetic flowmeter, its output is represented by the product of a magnetic flux density, the flow and the distance between the electrodes. Therefore, also in this case, the sensitivity k can be expressed by a function $k(BA, h)$ where BA is a magnetic flux density distribution, and h is the level of the fluid when the conduit cross-section configuration is strictly constant.

Similarly, a sensitivity $k'=OB/Q$ can be represented by a function $k'(BB, h)$ where BB is a magnetic flux density distribution due to the coil disposed below the conduit and the level h of the fluid.

Thus, the outputs OA and OB are represented as:

$$OA=k(BA, h) Q \quad (1)$$

$$OB=k'(BB, h) Q \quad (2)$$

Taking a ratio of expression (2) to expression (1), $$\begin{aligned} OB/OA &= k'(BB, h)Q/k(BA, h)Q \\ &= k'(BB, h)/k(BA, h). \end{aligned} \quad (3)$$

Magnetic flux density distributions BA and BB are fixed density distributions obtained by exciting coils 3A and 3B, so that k'(BB, h)/k(BA, h) can be handled as a function of only level h. By putting this ratio as K(h), expression (3) can be rewritten as follows:

$$OB/OA=K(h) \quad (4)$$

This relationship is shown in FIG. 2A. The relationship of expression (4) involves no slope of the conduit.

Therefore, (1) if the relationship shown in FIG. 2A or the first relationship is beforehand obtained for a conduit with a slope; (2) the outputs OA' and OB' are measured for a measured conduit with the same cross-sectional configuration; (3) the ratio OB'/OA' is calculated; and (4) the relationship in FIG. 2A is referred to, the level is determined even if the slope of the measured conduit is unknown.

While in the above the relationship OB/OA is used, OA/OB (FIG. 2B), OB/(OA+OB) (FIG. 2C), OA/(OA+OB) (FIG. 2D), (OA+OB)/OB (FIG. 2E) and (OA+OB)/OA (FIG. 2F) may be similarly used to determine the level of the fluid because they are each a function of level h alone.

FIG. 5 shows the relationship between each of slopes of conduits and flow Q at a respective one of various levels. If conduits whose flows are to be measured have the same cross-sectional configuration and their slopes are known, the flows of fluids flowing through the conduits are obtained by specifying the levels of the fluids using the above method.

The flow is obtained by storing data on the relationships of FIG. 5 in a memory of a computer system and inputting a level and a slope into the system.

If the slope of a measured conduit is unknown, a method of obtaining a flow will be described below.

As described above, assume that the level takes three values, for example, of 0.2 D, 0.5 D and 0.9 D. The measurement is equal to measurement using full-fluid electromagnetic flowmeters having different cross-sectional configurations such as those shown in FIGS. 6A, 6B and 6C.

If the cross-sectional configuration changes, the sensitivity k also changes. In other words, if the level is constant, the sensitivity k=OA/Q is also constant (see FIG. 7).

If the level is constant in a non-full fluid state, relationship between flow Q and the slope of the conduit may be assumed constant. That is, if the slope becomes steep, the flow also increases. Therefore, if the level is constant, an unknown slope is involved in an unknown flow to be measured.

If the level h' of a measured conduit is calculated from the relationship of FIG. 2A by referring to the relationships of FIGS. 1 and 2A, a flow Q in a reference conduit, whose slope is already known, used to obtain the relationship of FIGS. 1 and 2A at the level h' is obtained because the flow and level are in a one-to-one relationship in the reference conduit. An output OA(h') in the reference conduit at level h' or at flow Q is determined from the curve OA of FIG. 1.

As described above, if the level is the same, the sensitivity does not change, so that the following relationship holds between the reference and measured conduits:

$$k(h')=OA(h')/Q=OA'/Q' \quad (5)$$

where OA' is an output from the measured conduit and Q' is the flow to be obtained. Therefore, the measured flow Q' is determined from $$Q'=OA'\times Q/OA(h')=OA'/k(h') \quad (6)$$

When flow Q' is calculated in this way, the curve OA of FIG. 1 and the relationship in FIG. 2A are stored as data in the memory of the computer system. While the relationship for the curve OA is used in the above example when the sensitivity k(h') is calculated, the relationship for the curve OB or the curve OA+OB may be used.

If the level is obtained from FIG. 7, the sensitivity is obtained. Therefore, the measured flow Q' is obtained from $$Q'=OA'/k \quad (7)$$

on the basis of the output OA' from the appropriate conduit.

In this case, the level may be used in any method. For example, an ultrasonic wave type, pressure type or flowing type of level meter known conventionally may be used.

According to another aspect of the present invention, a flow rate of a fluid flowing through a conduit being monitored (i.e., the conduit for which the flow rate is to be measured) disposed at an unknown slope can be measured with high accuracy.

It should be recalled that determination of the flow rate (Q') in accordance with the expression (6) is based on the assumption that the sensitivity at the same fluid level remains the same independent of the slope at which the conduit being monitored (refer to FIG. 7) is disposed. This assumption must be modified when higher accuracy of measurement is required, because the outputs OA and OB of the sensor are considered to change when the slope at which the conduit being monitored is disposed changes and because, the flow rate distribution varies correspondingly even when the fluid level within the conduit remains constant.

FIG. 8 illustrates a relation between the flow rate Q and the sensitivity k at different slopes $\alpha$, $\beta$ and $\gamma$ (where $\alpha<\beta<\gamma$). It is to be noted that the characteristics are exaggeratedly illustrated only for clarification, being understood that in practical applications the influence of difference in the slope to the results of measurements is of rather less significance, as will become apparent as the description proceeds. However, it has experimentally been established by the inventors of the present application that in such applications where high accuracy requirement is imposed on the measurement, the differences in the relations or characteristics illustrated in FIG. 8 can not be neglected.

Similarly, the relation between the flow rate and the ratio of the sensor output OA to OB shown in FIG. 2A varies in a manner illustrated in FIG. 9 as a function of change in the slope at which the conduit is disposed. More specifically, in the characteristic diagrams illustrated in FIGS. 8 and 9, it is noted that the characteristic curves are shifted in the direction substantially parallel to the abscissa as a function of change in the slope.

Now, description will turn to a method of measuring the flow rate of a fluid flowing through a conduit disposed at an unknown slope by referring to FIGS. 8 and 9.

Through the similar procedure described hereinbefore in conjunction with FIGS. 1 and 2A, the outputs OA and OB are determined. Representing by $K_0$ the ratio between the outputs OB and OA, it is possible to determine the flow rates $Q\alpha_0$, $Q\beta_0$ and $Q\gamma_0$ in the reference conduit when it is disposed at the slopes of $\alpha$, $\beta$ and $\gamma$, respectively, by referencing the characteristic diagram of FIG. 9. Additionally, the sensitivities can be determined by referencing the relations illustrated in FIG. 8. Thus, there can arithmetically be determined three flow rates Q', Q" and Q'" corresponding to the slopes $\alpha$, $\beta$ and $\gamma$, respectively, in accordance with the expression (6) and by reference to the relations illustrated in FIG. 8 and 9. These three flow rates will hereinafter be referred to as the tentative flow only for the convenience of description.

Next, a method of determining the slope $\rho$ of the conduit under monitor from the above-mentioned tentative flow rates Q', Q" and Q'" will be described. This method is based on the fact that the characteristic curves illustrated in FIGS. 8 and 9 will shift in the direction substantially parallel to the abscissa as a function of slope. To say in another way, the flow rate increases as the slope becomes steeper.

At first, slopes $\alpha$ and $\beta$ are selected arbitrarily. Then, the flow rates $Q\alpha_0$ and $Q\beta_0$ (also referred to as the first flow rates) are determined on the basis of the relations illustrated in FIG. 9 in the case where the conduit is disposed at these slopes $\alpha$ and $\beta$, respectively. On the other hand, the tentative flow rates Q' and Q" are determined in accordance with the expression (6) and with the aid of the data illustrated in FIGS. 8 and 9. When a relation of $\alpha<\rho<\beta$ applies valid among the slope $\rho$ of the conduit being monitored and the selected slopes $\alpha$ and $\beta$, there can be derived a relation illustrated in FIG. 10A with a relation shown in FIG. 10B being obtained when $\rho<\alpha<\beta$, while a relation of FIG. 10C applies valid in the case where $\alpha<\beta<\rho$. The relations in FIGS. 10A, 10B and 10C can be summarized in the following expressions:

$$\rho = \frac{Q\beta_0 - Q''}{Q\beta_0 - Q\alpha_0 + Q' - Q''}\alpha + \frac{Q' - Q\alpha_0}{Q\beta_0 - Q\alpha_0 + Q' - Q''}\beta \tag{8}$$

From the above expression (8), the slope $\rho$ of the conduit under monitor can be determined.

Once the slope $\rho$ has been determined, the characteristic curve bearing the closest relation to this slope is selected from those illustrated in FIGS. 8 and 9, which is then followed by determination of the actual or true flow rate within the conduit being monitored in accordance with the expression (6). By way ore example, assuming that the slope $\rho$ is close to $\alpha$ or $\beta$, then Q' or Q" can be adopted as the actual or true flow rate. The characteristic curve of the slope $\rho$ can be estimated from the curves in FIGS. 8 and 9 by interpolation/extrapolation.

It should be added that in order to ensure high accuracy, it is desirable to previously determine the relations illustrated in FIGS. 8 and 9 for as many slopes as possible. By way of example, the slope may preferably be determined stepwise by 1/1000 (i.e., an the slope may be incremented or decremented by 1/1000). Further, the slopes $\alpha$ and $\beta$ employed in determination of the slope $\beta$ of the conduit of concern should preferably be selected within a range of 2/1000 to 10/1000.

According to another aspect of the invention, the flow rate of a fluid flowing through a conduit being monitored can be measured with high accuracy even when the fluid differs from that employed in the measurement of the flow rate in the reference conduit.

The fluid flowing through a monitored conduit being monitored does not necessarily coincide with a fluid used in the measurement carried out with the reference conduit. In this conjunction, it has been established by the inventors of the present application that difference in the conductivity of fluid exerts influence on the result of measurement of the flow rate.

It should be recalled that determination of the flow rate in accordance with the expression (6) is based on the presumption that the sensor output ratio OB/OA and the fluid level h bear one-to-one correspondence relation (refer to the expression (4): OB/OA=K(h)). In contrast, the aspect of the invention now under consideration is based on the recognition that the sensor output ratio OB/OA is a function of the fluid level h and the electrical conductivity c of the fluid. Namely, $$OB/OA = K(h, c) \tag{9}$$

Now, let's represent the term K(h, c) by $K_0$ and depict the above function in a three-dimensional coordinate system with h, c and $K_0$ used as parameters and project it on a plane (h—c). Then, a function represented by a solid line curve shown in FIG. 11 can be obtained. On the other hand, according to the assumption adopted in the expression (6), the function may be represented by a broken curve shown in FIG. 11.

As can be seen from the solid line curve shown in FIG. 11, it is impossible to determine the fluid level with sufficient accuracy solely on the basis of the sensor outputs OA and OB when a fluid flowing through the conduit under monitor has an electrical conductivity which differs significantly from that of a fluid used in the measurement carried out for the reference conduit.

Similarly, the electrical conductivity of the fluid affects the sensitivity k of the sensor. Thus, $$k = k(h, c) \tag{10}$$

From the above expression (10), the expression (6) can be rewritten as follows:

$$Q = OA/k(h, c) \tag{11}$$

Under the circumstances, the inventors of the present application have developed a method of processing the sensor output so that the obtained result can be represented by a function on the (h—c) plane similarly to the case illustrated in FIG. 11. In this case, by determining an intersection with the curve shown in FIG. 11, the fluid level h and the electrical conductivity c can be identified. In other words, by solving two equations having two variables h and c, respectively, the fluid level and the electrical conductivity of the fluid can be determined as solutions of the above equations. By placing the solutions in the expression (11), the flow rate Q can accurately be determined.

In an effort to realize the concept described above, the inventors of the present application thus propose to provide a shunt resistor $R_S$ for shunting a lead wire extending from the electrode 21 of the sensor to the amplifier 27 to the ground potential and a shunt switch S2 for connecting and disconnecting the shunt resistor $R_S$ to and from the wire at a predetermined timing. In that case, it has been confirmed that the ratio s (=$OA_0/OA$) between the sensor output OA obtained when the upper coil 3A is excited with the shunt switch S2 being opened and the sensor output $OA_0$ obtained when the upper coil 3A is excited with the shunt switch S2 closed is a function of the fluid level h and the electrical conductivity c of the fluid flowing through the monitored conduit.

More specifically, when the output impedance of the flow meter main body which is determined in dependence on the fluid level h within the conduit 1 and the conductivity c of the fluid is represented by Rw, the flow rate signal E generated by the flowmeter undergoes a voltage division by the output impedance Rw and an input impedance Ri of the amplifier 7, as shown in FIG. 12. However, since it usually holds true that Rw<<Ri, it is safe to say that Ei≈E.

When the shunt switch S2 is closed, $$Ei \approx Rs \cdot E/(Rw+Rs)$$

so long as the condition that Rs<<Ri is satisfied. Accordingly, from the previously mentioned definition of s, $$s = Rs/(Rw+Rs)$$

Since Rs is known, expression s(h, c) can apply valid in view of Rw(h, c).

By representing s(h, c) by $S_0$ and, depicting this function with h, c and $S_0$ as parameters in the three-dimensional coordinate system and projecting the function on the (h—c) plane, there can be obtained a function which is represented by a solid line curve shown in FIG. 13.

The level h and the electrical conductivity c of a fluid flowing through the conduit being monitored can be determined from intersection of the function illustrated in FIG. 13 and the solid-line curve of FIG. 11, as is illustrated in FIG. 14. Thus, by referencing the data shown in these figures, it is possible to determine the sensitivity k(=k(h, c)) in the expression (10). Once the sensitivity k has been determined, the flow rate can be determined in accordance with the expression (11).

BRIEF DESCRIPTION OF THE DRAWINGS

These and other objects and technical advantages of the present invention will be readily apparent from the following description of the preferred embodiment exemplary embodiments of the present invention in conjunction with the accompanying drawings in which:

FIG. 5 shows the relationship between the level, conduit gradient and flow.

FIG. 6A–6C are views corresponding to FIG. 3 and show three cases where the corresponding levels are different one from the other.

FIG. 26 is a flowchart indicative of the operation of the CPU of the FIG. 24 embodiment.

FIG. 27 illustrates the coordinates of correction reference data.

FIG. 28 illustrates the coordinates of correction reference data.

FIG. 29 illustrates recording of correction reference data on a ROM.

FIG. 47 illustrates the relation between output OB and flow rate of respective central angles and conductivities of a fluid to be measured.

DESCRIPTION OF THE PREFERRED EMBODIMENTS

Figure 15A:
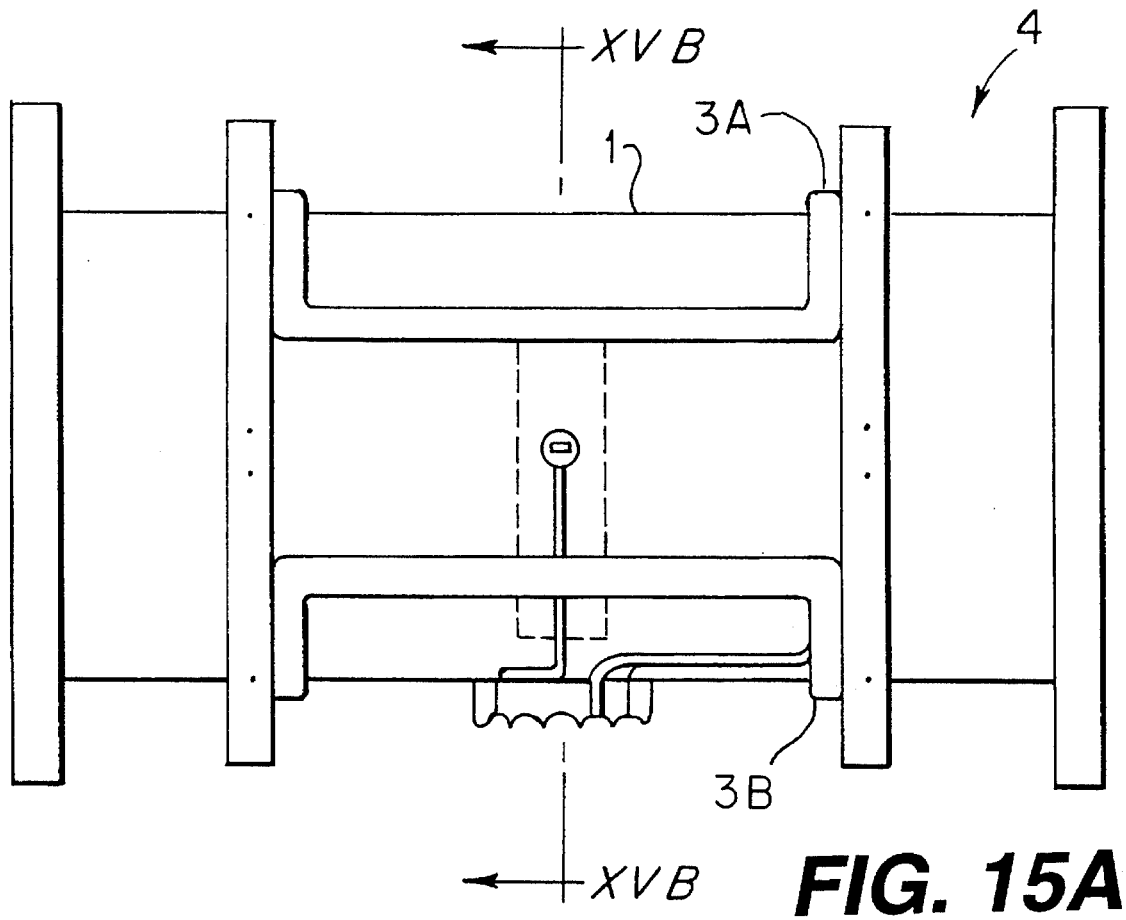
FIG. 15A is a front view of an embodiment of a flow sensor in the present invention.
Figure 15B:
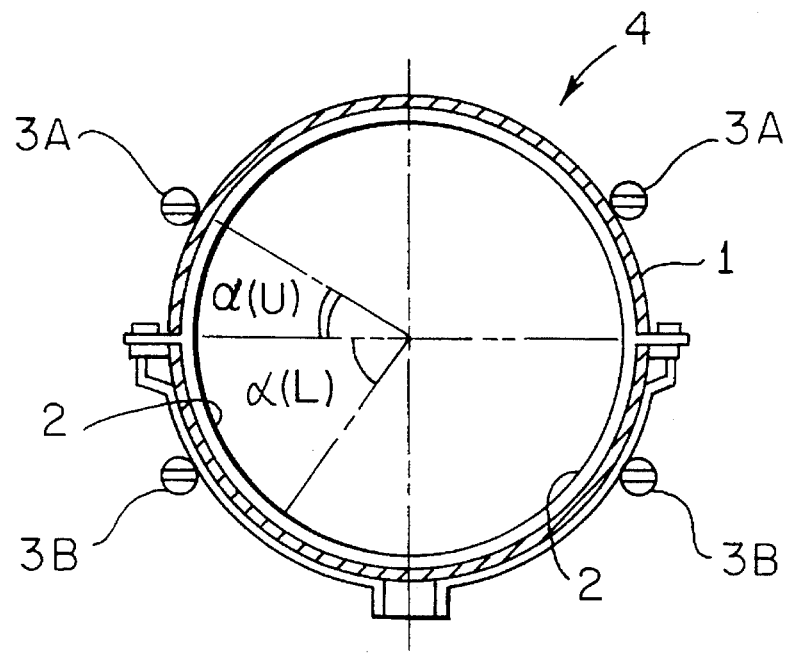
FIG. 15B is a cross-sectional view taken along the line A—A of FIG. 15A.
Figure 16:
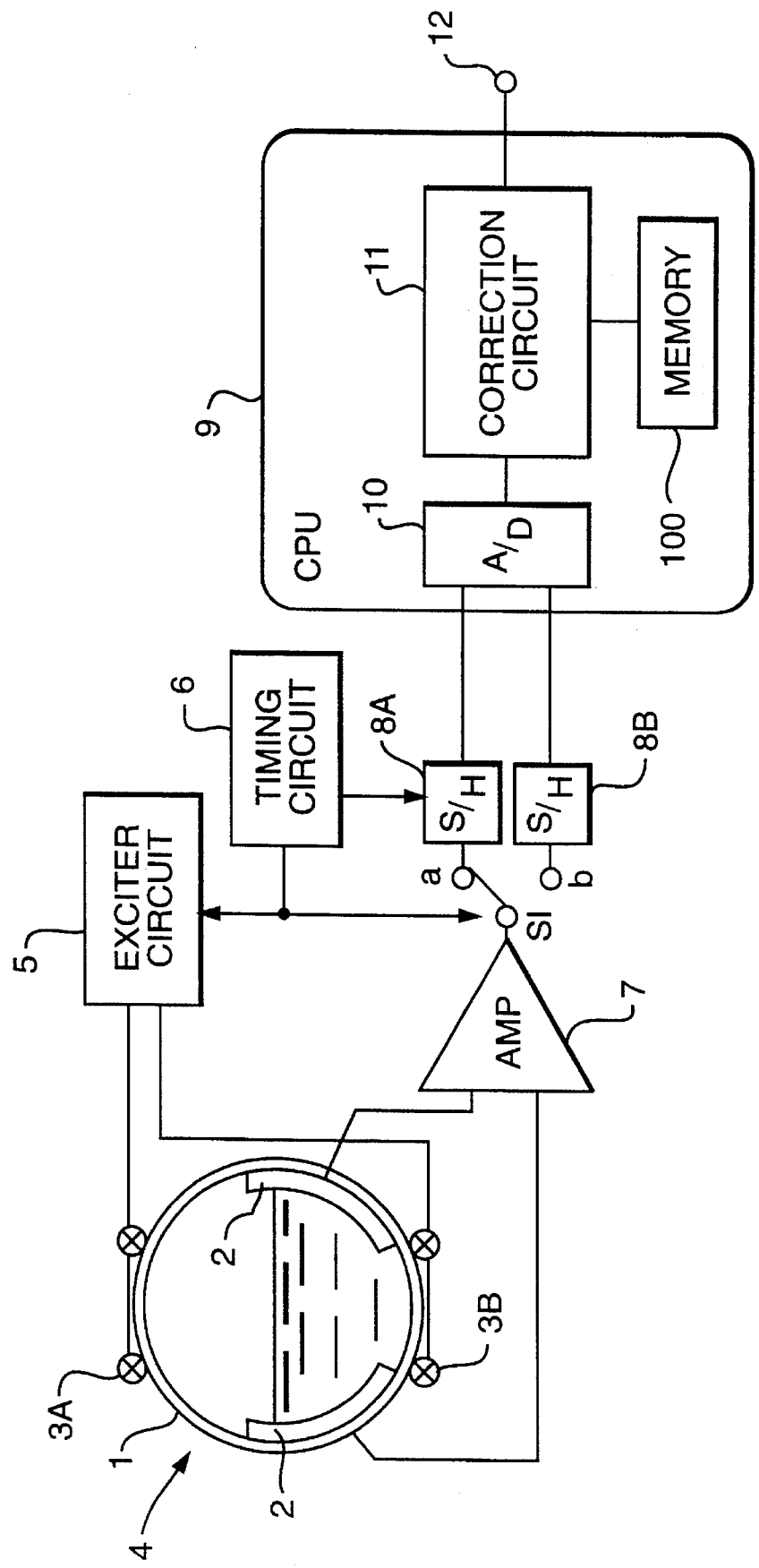
FIG. 16 is a block diagram indicative of one embodiment of an electromagnetic flowmeter according to the present invention.

Referring to FIGS. 15 and 16, reference numeral 1 denotes a circular cross-sectional conduit through which a fluid being monitored flows; 2 is a pair of electrodes provided at positions symmetrical around a vertical line passing through an axis of the conduit 1; 3A, 3B are a first and a second exciting coil which generate different magnetic flux density distributions BA and BB at different intervals of time; and 4 is a flow sensor having such structure.

An exciting circuit 5 alternately energizes the first and second exciting coils 3A and 3B in accordance with a signal from a timing circuit 6. Reference numeral 7 denotes an amplifier which amplifies and outputs a voltage induced across the electrodes 2; S1 is a changeover switch which is switched in accordance with a signal from the timing circuit 6 synchronously with the timing signal of energization of the exciting coils 3A and 3B. When the first exciting coil 3A is energized, the switch S1 is switched to a contact a while when the second exciting coil 3B is energized, it is switched to a contact b.

Reference characters 8A and 8B denote a first and a second sample and hold circuit which perform an sample and hold operation by receiving a signal through the contacts a and b; 9 is CPU; 10 is an A/D converter which converts an analog signal from each of sample and hold circuits 8A, 8B to a digital signal; 11 denotes a processing circuit which stores a program for the above calculation; and 12 is an output terminal which outputs a flow signal Q' as the result of the calculation.

Figure 17:
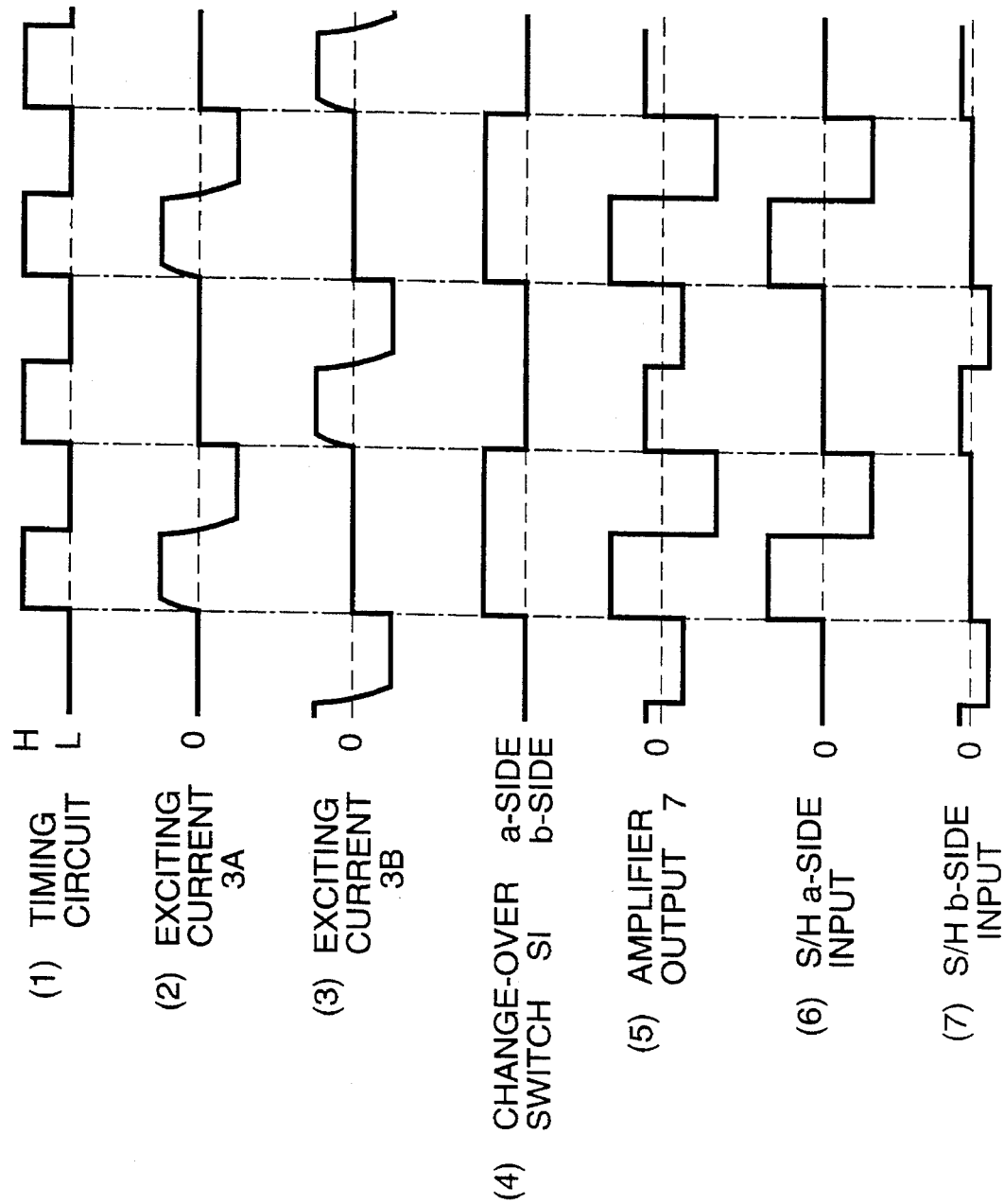
FIG. 17 is a timing chart indicative of the operation of the electromagnetic flowmeter.

FIG. 17 is a timing chart for the electromagnetic flowmeter of FIG. 16 which shows a signal from the timing circuit 6, exciting currents flowing through the first and second exciting coils 3A and 3B, the operation of the changeover switch S1, the output from amplifier 7, and inputs to sample and hold circuits 8A and 8B.

Figure 18:
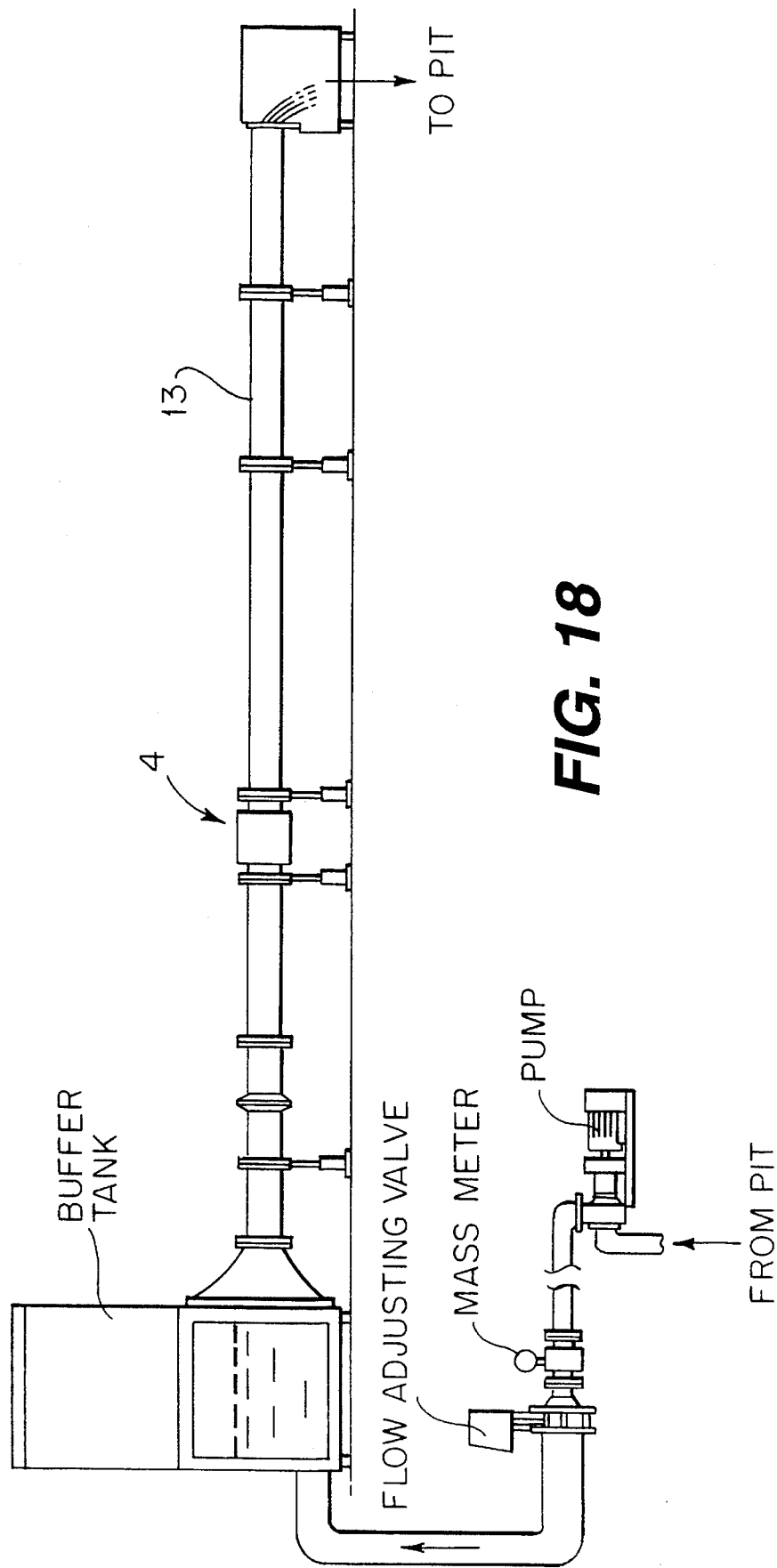
FIG. 18 schematically illustrates an experimental device used for examining the accuracy of a flow measuring method according to the present invention.

FIG. 18 shows the overall device used for an experiment to examine the accuracy of the inventive measuring method and having the flow sensor 4 of FIGS. 15 and 16 attached to a vinyl chloride tube 13 having an inner diameter of 200 mm and a length of about 8 m. The slope of this tube is fixed at 2/1000. In this case, the relationship between the output OA of the electromagnetic flowmeter and the actual flow Q measured using the first exciting coil 3A is shown by a curve OA in FIG. 19. The result of the measurement obtained by using the second exciting coil 3B at the same slope of the conduit used is shown by a curve OB.

Figure 19:
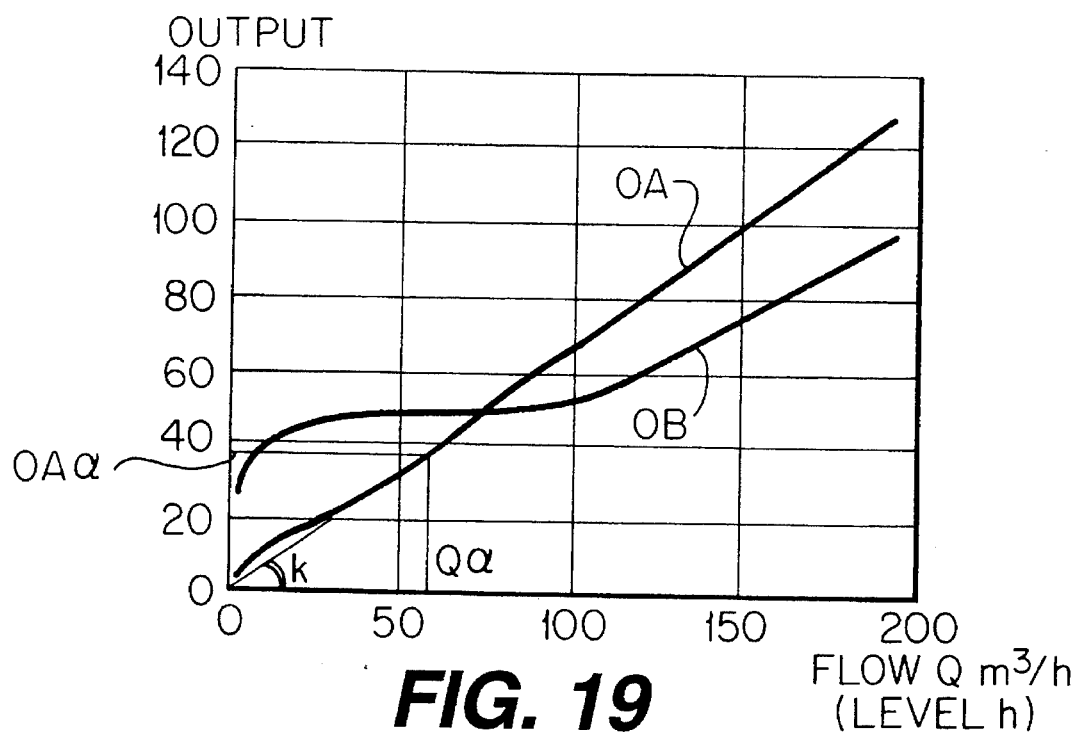
FIG. 19 is a diagram indicative of one example of the relationship between actual flow Q and outputs OA, OB of the flow sensor in the present invention.
Figure 20:
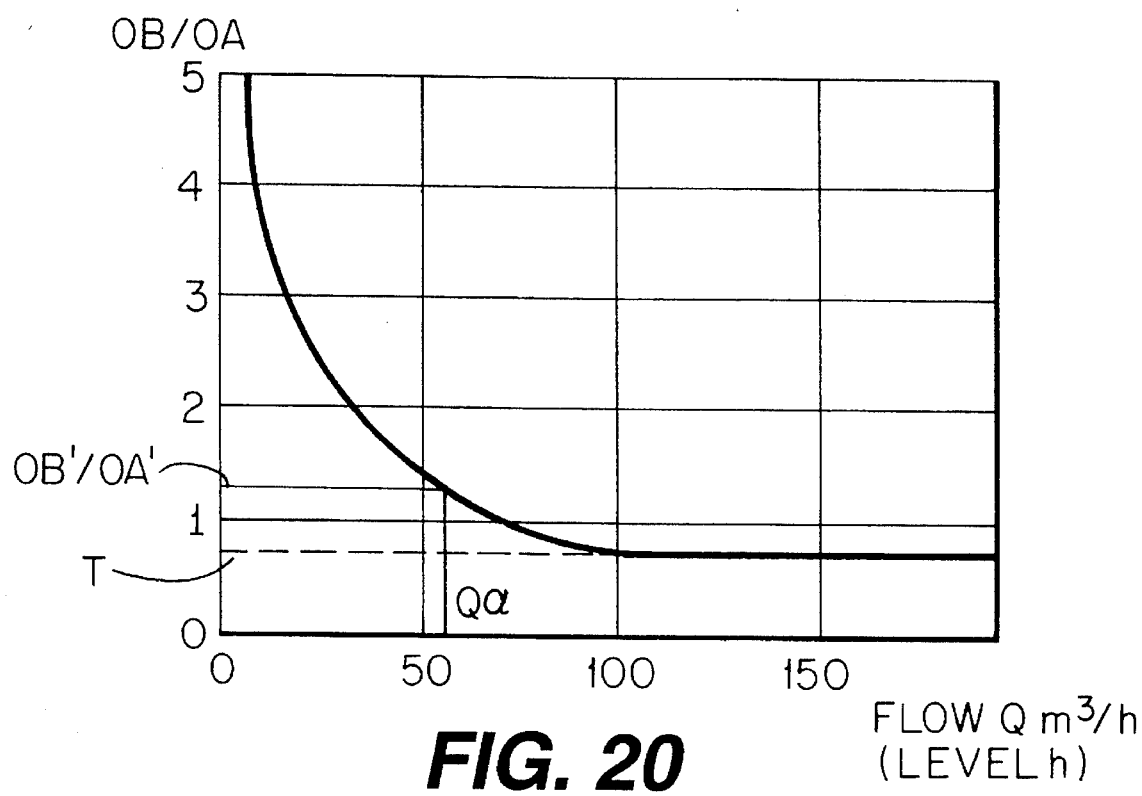
FIG. 20 is a graph of the relation between actual flow Q and ratio OB/OA calculated from data of FIG. 12.

FIG. 20 shows a ratio OB/OA obtained from both data OA and OB of FIG. 19. While in FIG. 20 the ratio OB/OA is a minimum constant value when the flow Q is substantially larger than 100[m³/h], which shows a full state of the conduit. It will be seen in FIG. 19 from the fact that in the range where the flow Q is substantially larger than 100[m³/h] the curves OA and OB have straight line segments which will pass through the origin of the coordinates that the flowmeter operates as a regular so-called full-fluid type electromagnetic flowmeter.

Data on the relationship shown in FIG. 19 and 20 is stored in memory 100 of CPU 9.

Figure 21:
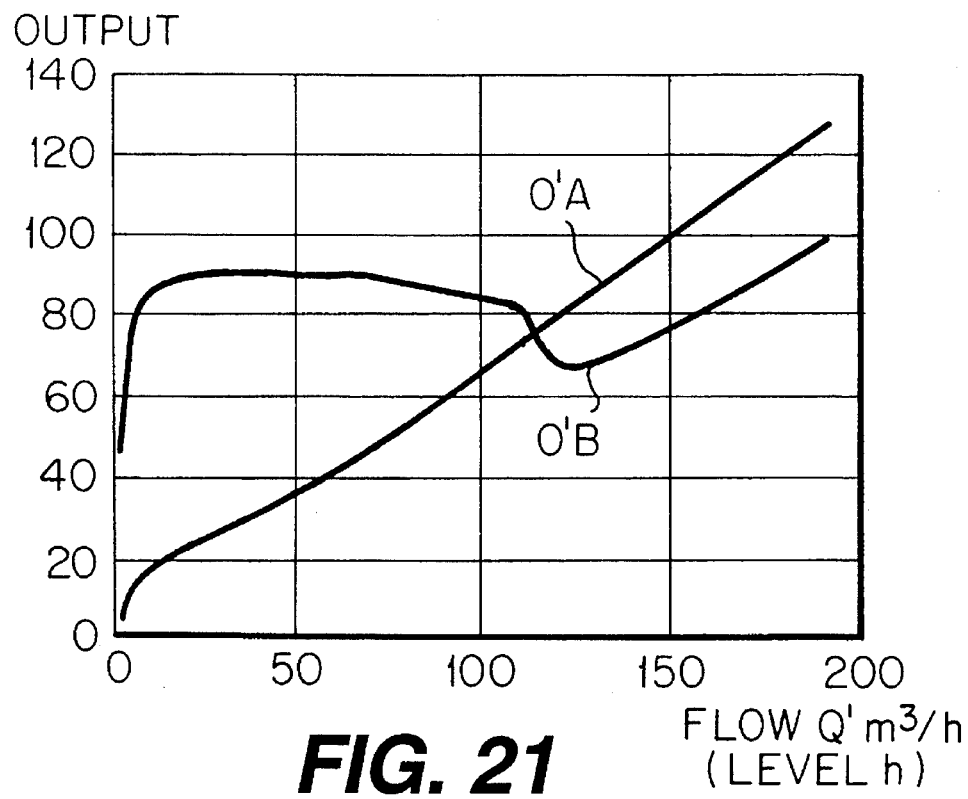
FIG. 21 is a graph of output curves corresponding to FIG. 22 obtained when the gradient of a conduit is changed.

FIG. 21 shows the relationship between the actual flow Q'[m³/h] measured by changing the slope of the conduit 13 to 6/1000 and the outputs OA', OB' obtained by exciting coils 3A and 3B, respectively, in the device of FIG. 18. While the actual flow is known in this experiment in FIG. 21, the unknown flow Q' is obtained from the above correcting method if OB'/OA'=α is calculated by assuming the actual flow Q'[m³/h] as being unknown; a flow Qα is obtained which is the value of OB/OA of FIG. 20 which corresponds to α, and the sensitivity OA/Qα is calculated from the curve OA in FIG. 19.

Figure 23:
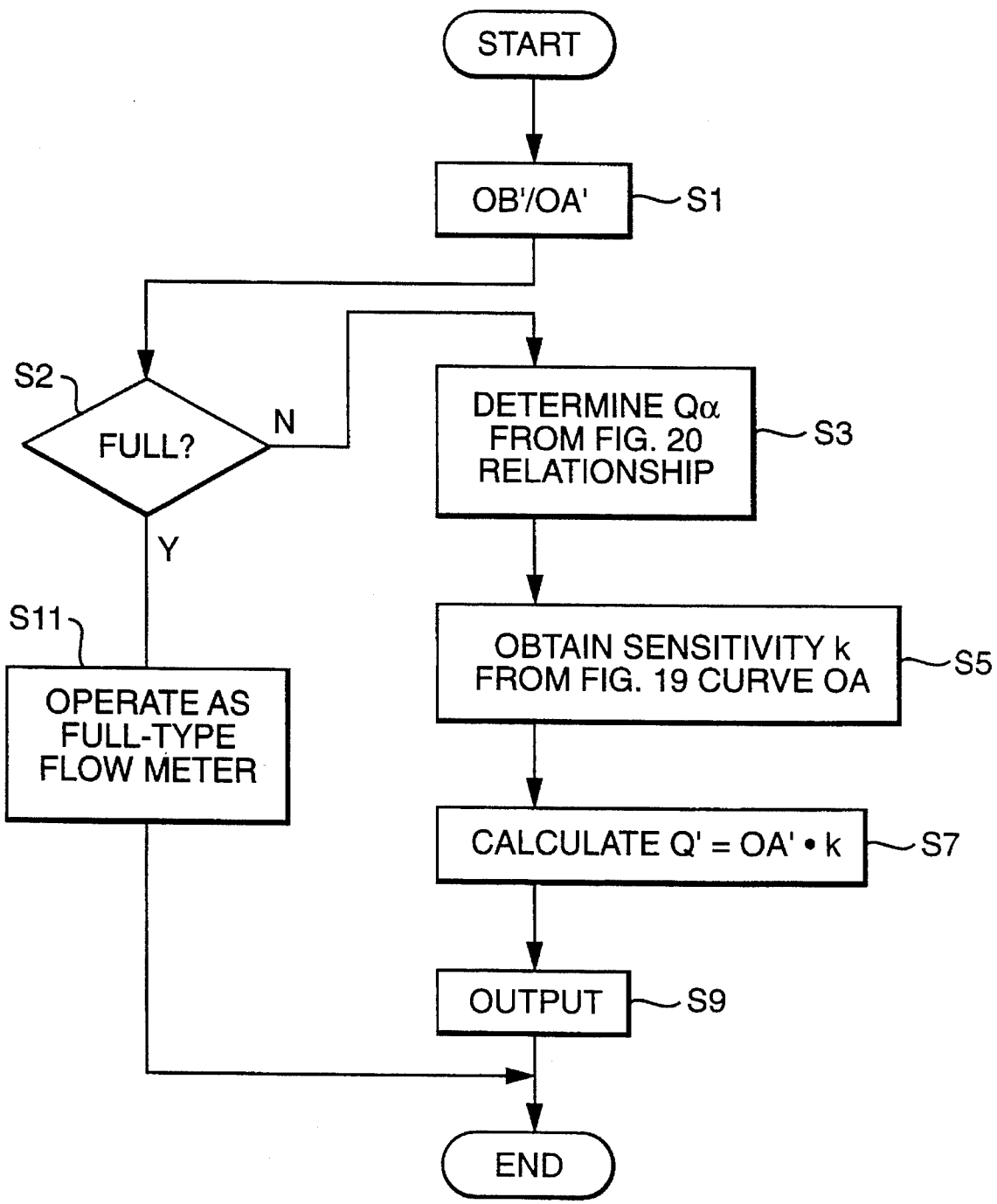
FIG. 23 is a flowchart indicative of the operation of a CPU in the embodiment.

The operation of the CPU 9 for obtaining the unknown flow Q' will be described below with reference to the flow chart of FIG. 23.

CPU 9 stores in registers (not shown) data on the outputs OA' and OB' from sensor electrodes 2 delivered from sample and hold circuits 8A, 8B and obtained when the upper and lower coils 3A and 3B, respectively, are energized. At step 1 a correction calculating circuit 11 reads out the respective outputs OB' and OA' from the corresponding registers and calculates a ratio OB'/OA'. At step 2 the circuit 11 determines whether the conduit is full of a flowing fluid or not. When OB'/OA' is equal to the value T of the straight line of FIG. 20, the circuit determines that the conduit is full of the fluid and control passes to step 11. If OB'/OA' is larger than T, the circuit 11 determines that the conduit is not full, and control passes to step 3, where the circuit 11 determines a flow Qα flowing through the reference conduit in accordance with the relationship of FIG. 20 stored in the memory 100.

At step 5 an output OAα corresponding to flow Qα is calculated on the basis of the relationship of the curve OA of FIG. 19 stored in the memory 100, and the calculating circuit 11 calculates k=OAα/Qα.

At step 7 the calculating circuit 11 again reads output OA' from the register and multiplies the output OA' by the sensitivity k obtained at the preceding step to determine a flow Q' to be measured, and then outputs it (step 9).

When it is determined at step 2 that the conduit is full of the fluid, the electromagnetic flowmeter of this embodiment operates as a full-fluid type (step 11). More specifically, it multiplies output OA' by the sensitivity k present when the conduit is full or at an level of 1.0 D. The sensitivity is obtained beforehand.

Of course, the flow of the fluid when the conduit is full of the fluid can be obtained also at steps 3–9.

Figure 22:
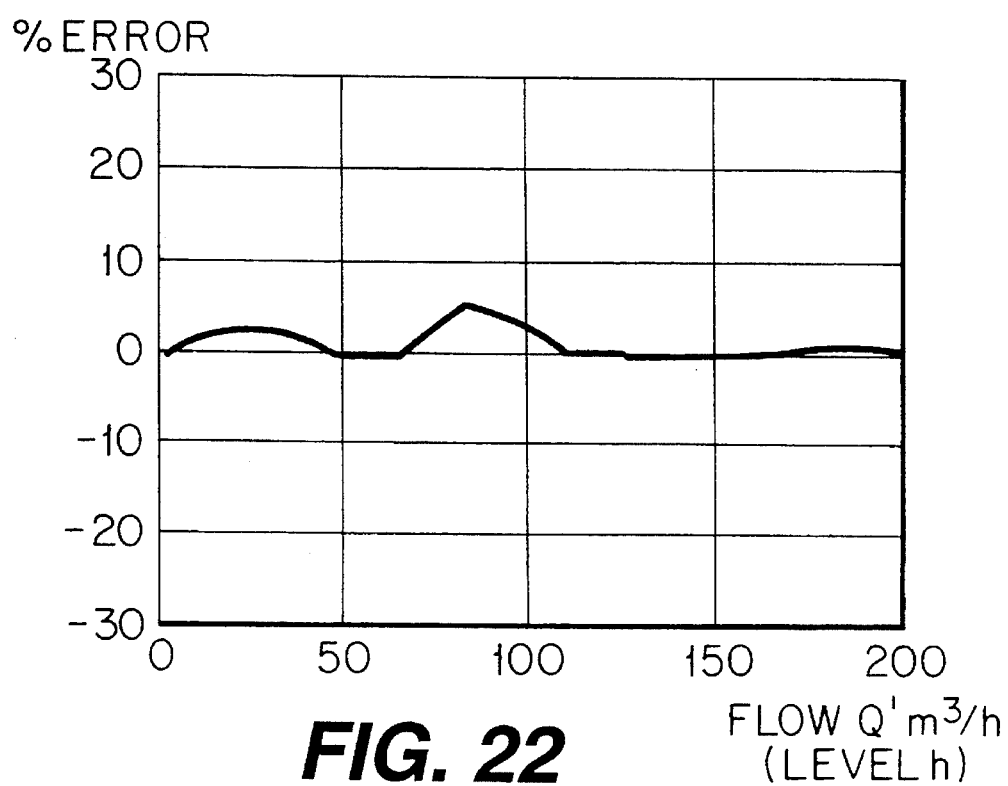
FIG. 22 shows an error characteristic curve on the embodiment of the present invention.

When device differences were sought at several points of flows Q', it was found that they were relatively small values as shown in FIG. 22 to thereby confirm the practicality of this measuring method. The instrumentation-ascribable error is replaced by "((measured value–true value)/true value)× 100 (%))" where the true value is obtained as the output of the reference or standard flow meter.

Figure 24:
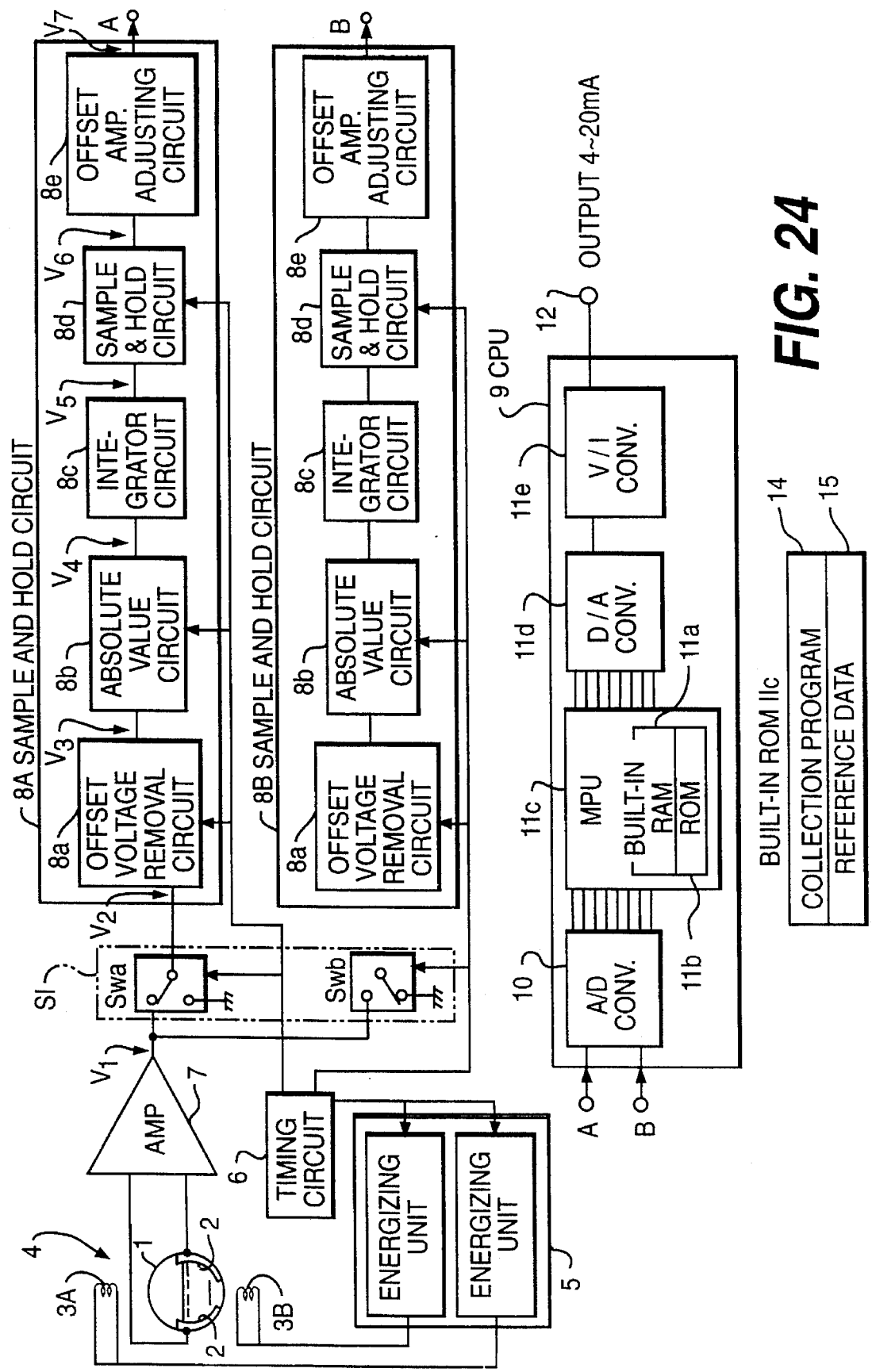
FIG. 24 is a block diagram indicative of a second embodiment of an electromagnetic flowmeter according to the present invention.

FIG. 24 shows a second embodiment of the electromagnetic flowmeter of the present invention. It additionally has modified details of the exciting circuit 5, changeover switch S1, first and second sample and hold circuits 8A, 8B and CPU 9 of FIG. 16.

The exciting circuit 5 is provided with two exciting units which excite the exciting coils 3A and 3B alternately in accordance with the signal from the timing circuit 6.

The changeover switch S1 is composed of changeover switches Swa and Swb. When one changeover switch, for example, Swa, supplies the output signal from amplifier 7 to the first sample and hold circuit 8A, the other changeover switch Swb grounds the input b to the second sample and hold circuit 8B.

The first and second sample and hold circuit 8A and 8B have the same structural details and are each composed of an offset voltage removal unit 8a, absolute value unit 8b, integrator 8c, sample and hold circuit 8d and an offset and amplification degree adjusting unit 8e.

Reference characters A and B denote the corresponding output terminals for the first and second sample and hold circuits 8A and 8B.

CPU 9 is composed of an A/D converter 10, microprocessor unit 11c which is provided with built-in RAM 11a and ROM 11b, D/A converter 11d and V/I converter 11e.

The built-in ROM 11c stores a correction program 14 and correction reference data 15, to be described later in more detail.

CPU 9 outputs an analog flow signal of 4–20 mA at its output 12.

The operation of the second embodiment shown in FIG. 24 will be described below. The two exciting units of the exciting circuit 5 operate alternately to supply exciting currents alternately to the exciting coils 3A and 3B.

An electromotive force generated across the electrodes 2 is delivered to the amplifier 7, whose output is alternately supplied to the first and second sample and hold circuits 8A, 8B through the changeover switches Swa and Swb depending on which of the coils 3A, 3B is energized.

Since the basic operations of the circuits 8A, 8B are exactly the same, the operation of the first sample and hold circuit 8A will be described as an example.

Figure 25:
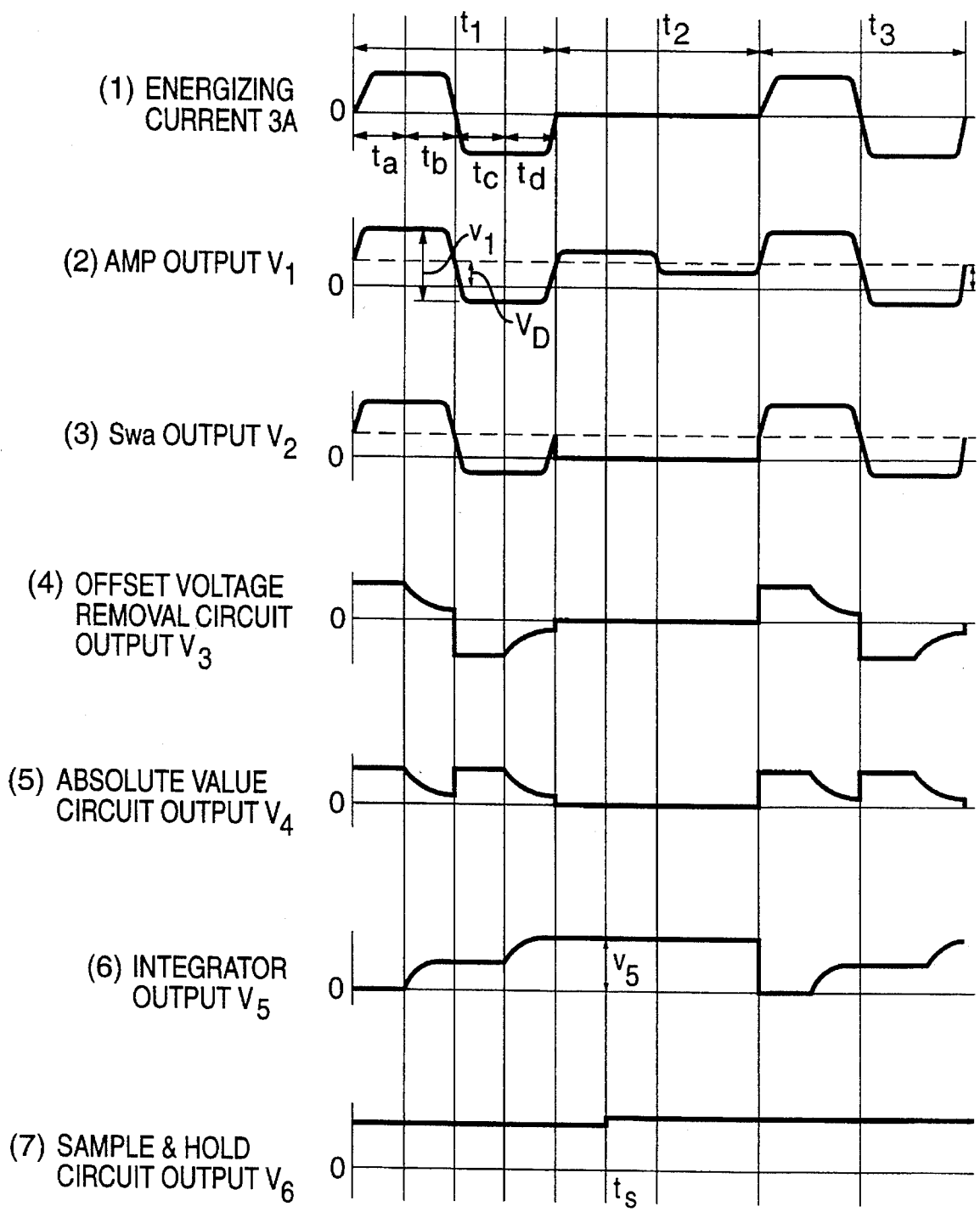
FIG. 25 is a timing chart for the operation of the embodiment of FIG. 24.

The following description is made on the basis of the timing chart of FIG. 25. (1), (2), . . . denote the timing chart numbers.

(1) The exciting current flowing through the exciting coil 3A flows intermittently as shown. The coil 3A is excited for the intervals of time t1, t3, . . . (for the other intervals of time t2, . . . , the other coil 3B is excited.)

(2) The output voltage V1 from the amplifier 7 is as shown at this time. It is known that a direct offset $V_D$ is superimposed inevitably.

(3) The output from the amplifier 7 are for the intervals of time t1, t3, . . . are supplied through the changeover switch Swa to the first sample and hold circuit 8A. For the interval of time t2, the input to the sample and hold circuit 8A is grounded through the changeover switch Swa.

(4) First, the signal is delivered to the offset voltage removal unit 8a. The removal circuit 8a operates for only sub-intervals of time tb and td of the interval of time t1 to thereby result in a voltage waveform such as is shown because the integrated value of the input voltage is subtracted from the input voltage.

(5) The output V3 from the offset voltage removal unit 8a is input to the absolute value circuit 8b to invert minus portions of the output for the intervals tc, td to thereby provide an output V4.

(6) The outputs V4 from the absolute value circuit 8b is integrated by the integrator 8c for the intervals of time tb, td. Of course, the voltage V5 obtained finally corresponds to the amplitude V1 of the output from the amplitude 7 in (2).

(7) The voltage V5 is sampled and held by the sample and hold circuit 8d at timing ts to thereby provide an output V6.

Thereafter, the output V6 is output as an output voltage V7 to the output terminal A through the offset and amplification degree adjusting unit 8e. The output voltage V7 corresponds to the output OA or OA'.

Similarly, the output voltage supplied to the output terminal B of the second sample and hold circuit 8B corresponds to the output OA or OB'.

CPU 9 operates as follows. CPU 9 operates in timing independently of the sample and hold circuits 8A and 8B.

Synchronization of both the circuits 8A and 8B improves efficiency, but is not necessarily required.

FIG. 26 shows the flow of the operation of CPU 9 and repeats the processing at steps (1)–(4) as shown at intervals of time tr.

The voltage outputs at the output terminals A and B of the first and second sample and hold circuits 8A, 8B are updated at intervals of time (t1+t2) as will be obvious from the timing chart of FIG. 25, so that decreasing the period tr compared to the interval of time (t1+t2) implies taking the same output more than once, which is an ineffective operation.

If tr=(t1+t2) in that sense, all the data from the sample and hold circuits 8A, 8B are taken.

The operation of CPU 9 will be described in detail with reference to the flowchart of FIG. 26.

Step (1): The outputs at the output terminals A and B of the sample and hold circuits 8A, 8B are A/D sampled by the A/D converter 10. It is assumed at this time that the unknown flow Q' is already measured and that the outputs at the output terminals A and B correspond to the outputs O'A and O'B, respectively.

Step (2) for moving average processing: Noise is contained in outputs O'A and O'B. In the present invention, complicated correction such as taking an output ratio O'B/O'A is made, so that it is preferable to eliminate noise to some extent and then to resort to the correction procedures.

Otherwise, an error due to noise may be amplified during the correction procedures.

In order to eliminate noise, various methods would be considered. As an example, a moving average is taken, in which the last n A/D sampled data values obtained so far are partially updated at each sampling and stored in a memory and the arithmetic mean value of those data is used in the subsequent correction.

Step (3) for calculation: The procedures for calculation described alone in detail will be performed as follows.

Figure 1:
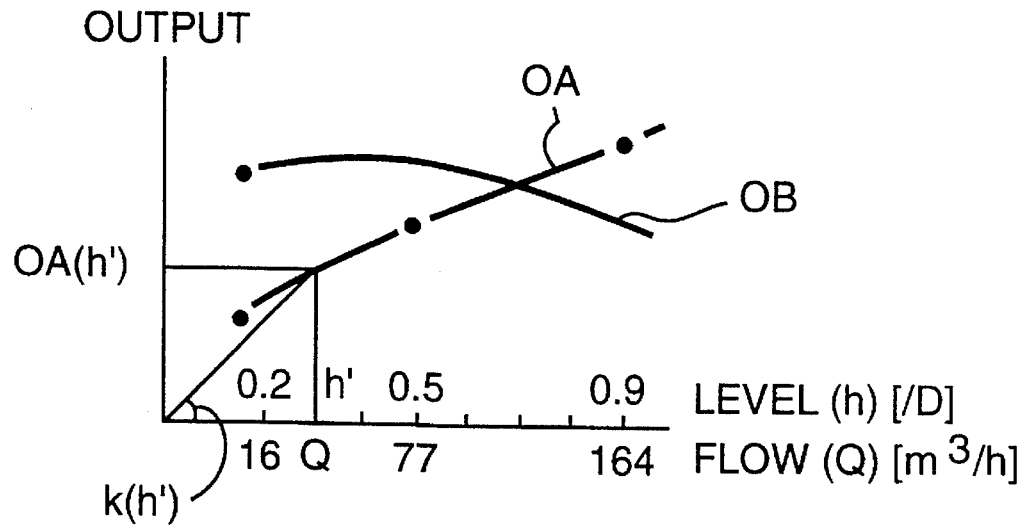
FIG. 1 shows the relationship between the output of a sensor and a flow obtained when the upper and lower coils on a reference conduit are energized.
Figure 2A:
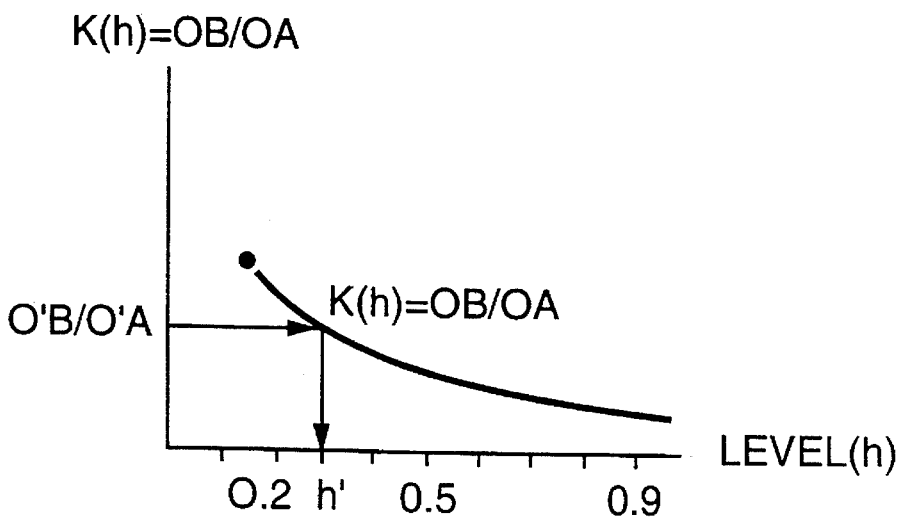
FIG. 2A–2F show the relationship between the level and ratio of curves OB to OA in FIG. 1.
Figure 2B:
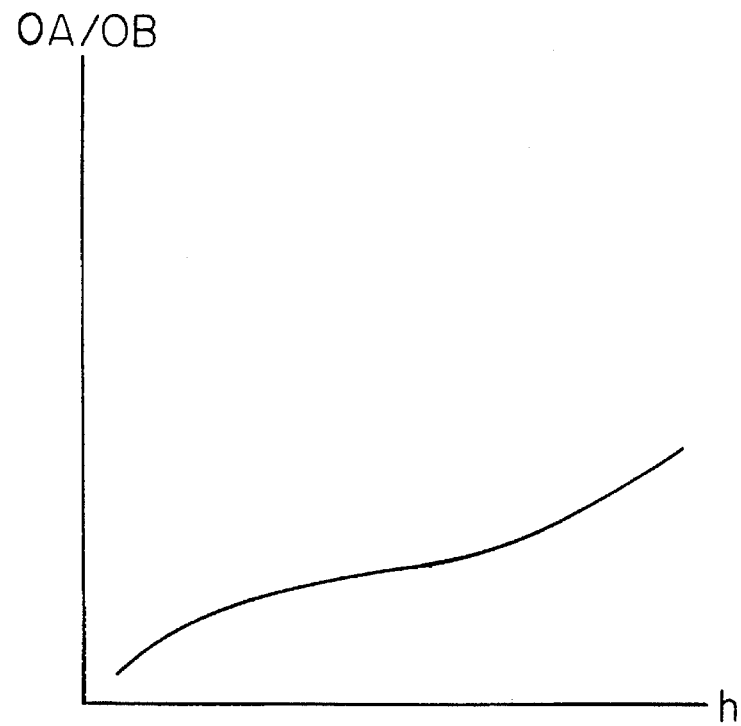
Figure 2C:
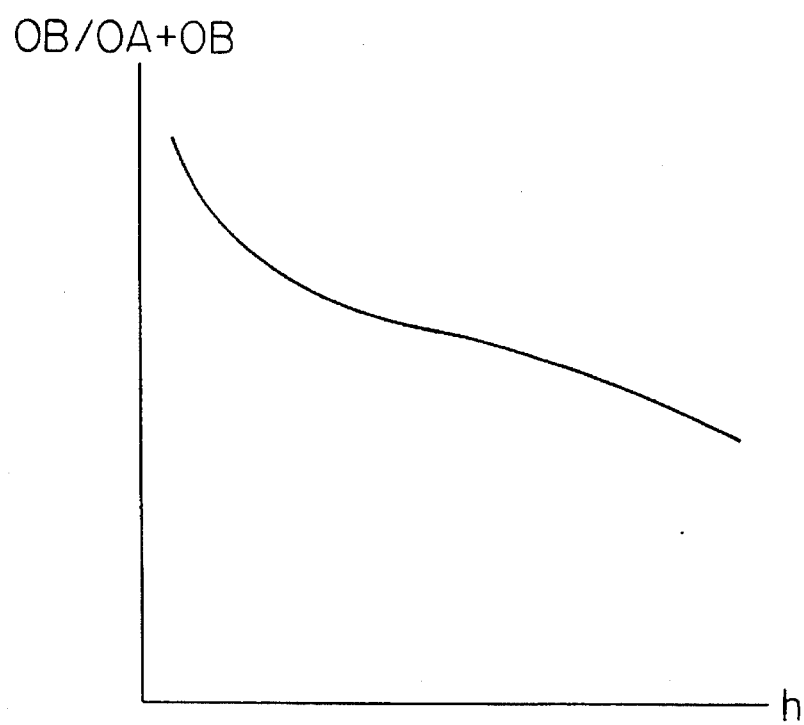
Figure 2D:
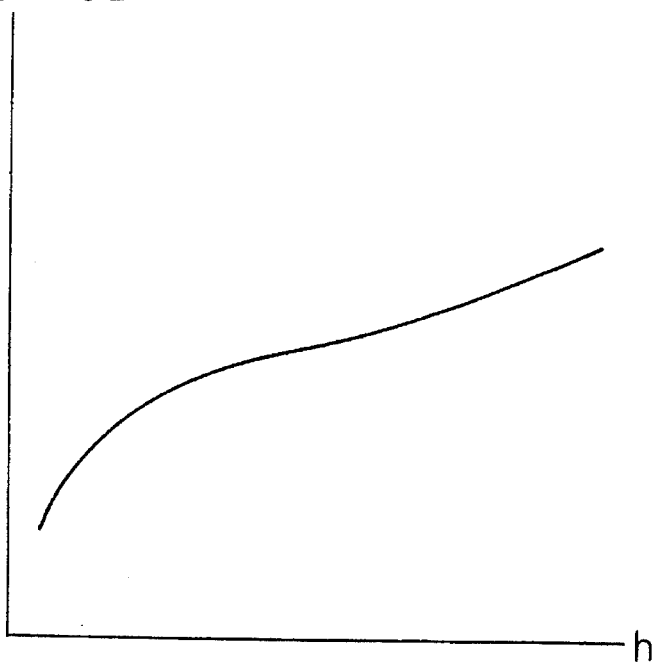
Figure 2E:
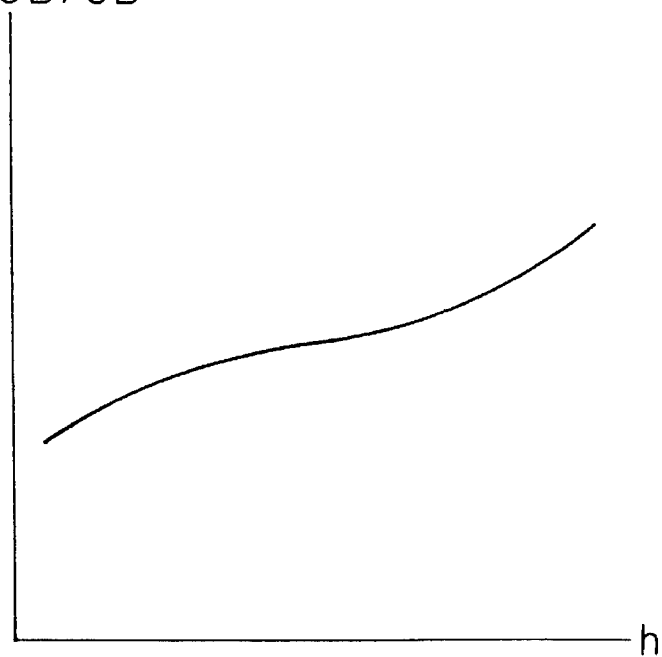
Figure 2F:
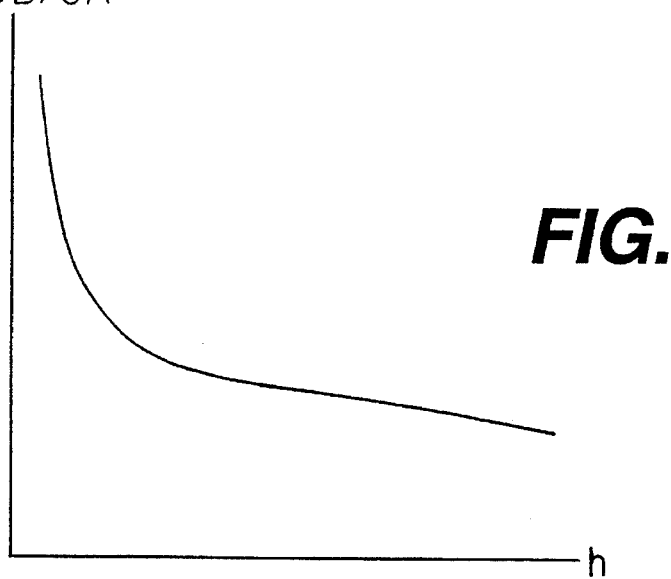
Figure 3:
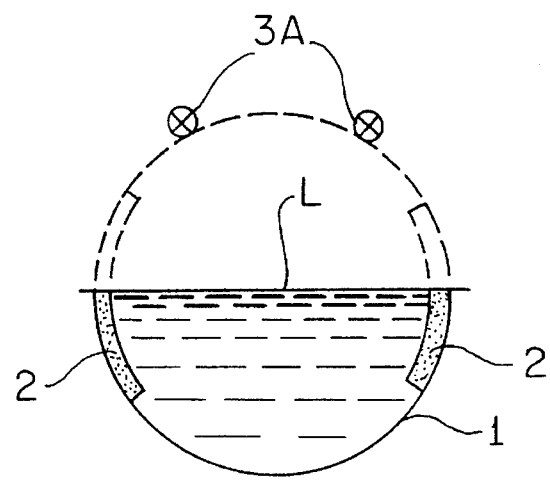
FIG. 3 schematically illustrates the principles of a flow sensor in the present invention.
Figure 4:
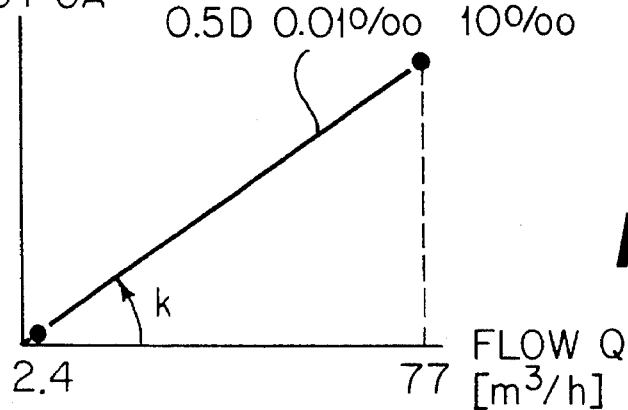
FIG. 4 is a graph of the relationship between a flow and an output of the flow sensor of FIG. 3 when the level is 0.5 D.
Figure 7:
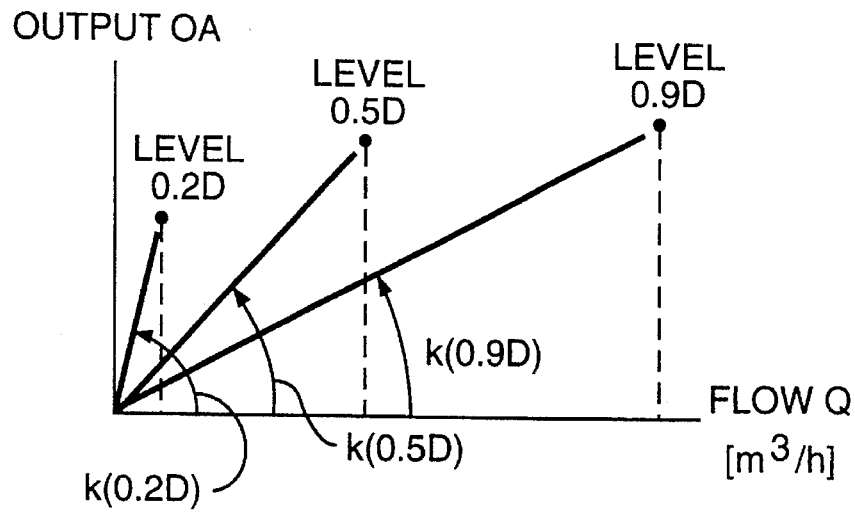
FIG. 7 is a graph of the relationship between flow and output at each of levels and corresponding to FIG. 6.
Figure 8:
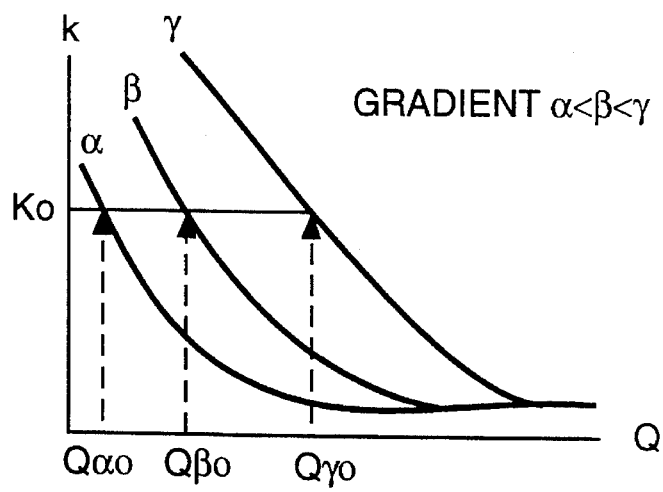
FIG. 8 shows a graph of the flow rate versus the sensitivity.
Figure 9:
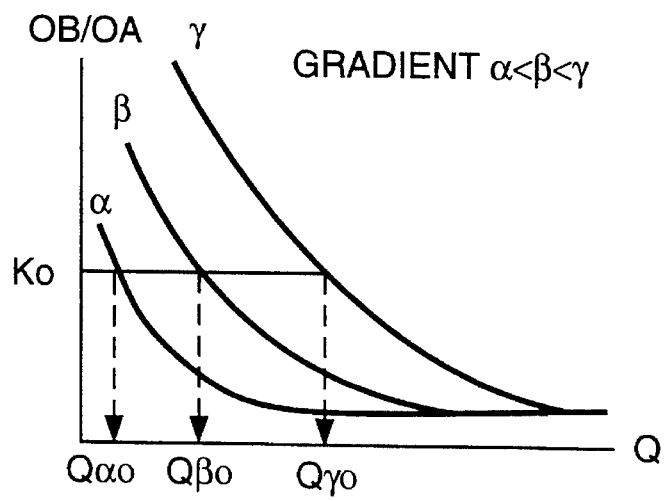
FIG. 9 shows a graph of the flow rate versus the output.
Figure 10A:
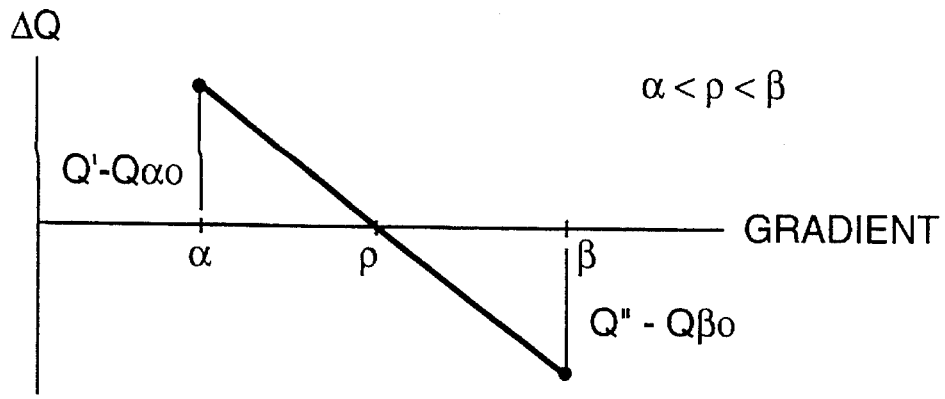
FIGS. 10A–10C show graphs of the flow rate versus the sensitivity ratio.
Figure 10B:
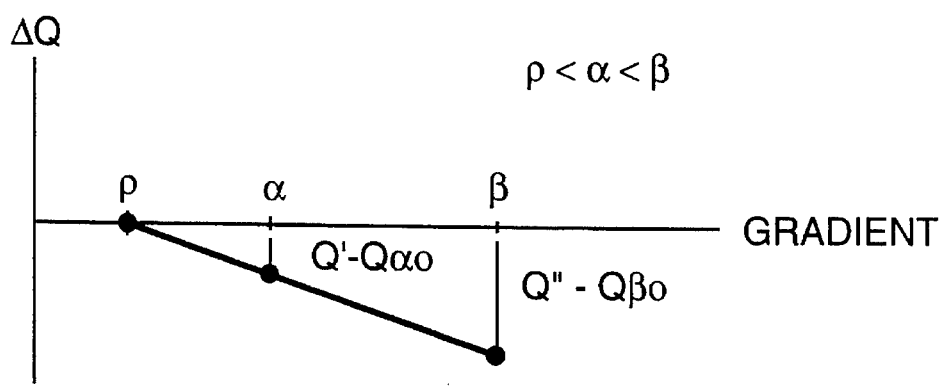
Figure 10C:
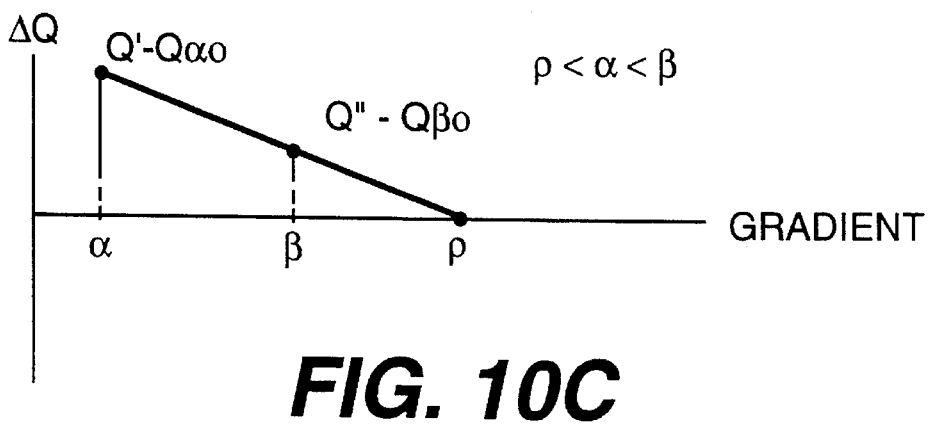

First, data corresponding to FIGS. 1 and 2A are taken from the outputs OA and OB measured beforehand for every several flows Q at a given slope of the conduit and are beforehand recorded as reference data 15 in ROM 11b of FIG. 17.

These data are obtained by actual measurement. First, the electromagnetic flowmeter of the present embodiment is attached to a conduit with a given slope. By controlling the flow using a reference meter while measuring outputs OA, OB, data shown in Table 1 below is obtained.

TABLE 1

| No. | Reference flow (m³/h) | Output OA (V) | Output OB (V) |
|---|---|---|---|
| 1 | 10 | 0.10 | 1.20 |
| 2 | 20 | 0.22 | 1.52 |
| 3 | 30 | 0.35 | 1.89 |
| 4 | 40 | 0.48 | 1.98 |
| . | . | . | . |
| . | . | . | . |
| . | . | . | . |

As shown in FIGS. 27 and 28, the coordinates of points 1, 2, 3, 4, ..., n shown by dots are obtained on the curves of FIGS. 1 and 2A.

Data for the coordinates of these dots are arranged and stored as reference data 15 (FIG. 24) on ROM 11b, as shown in FIG. 29.

Figure 30A:
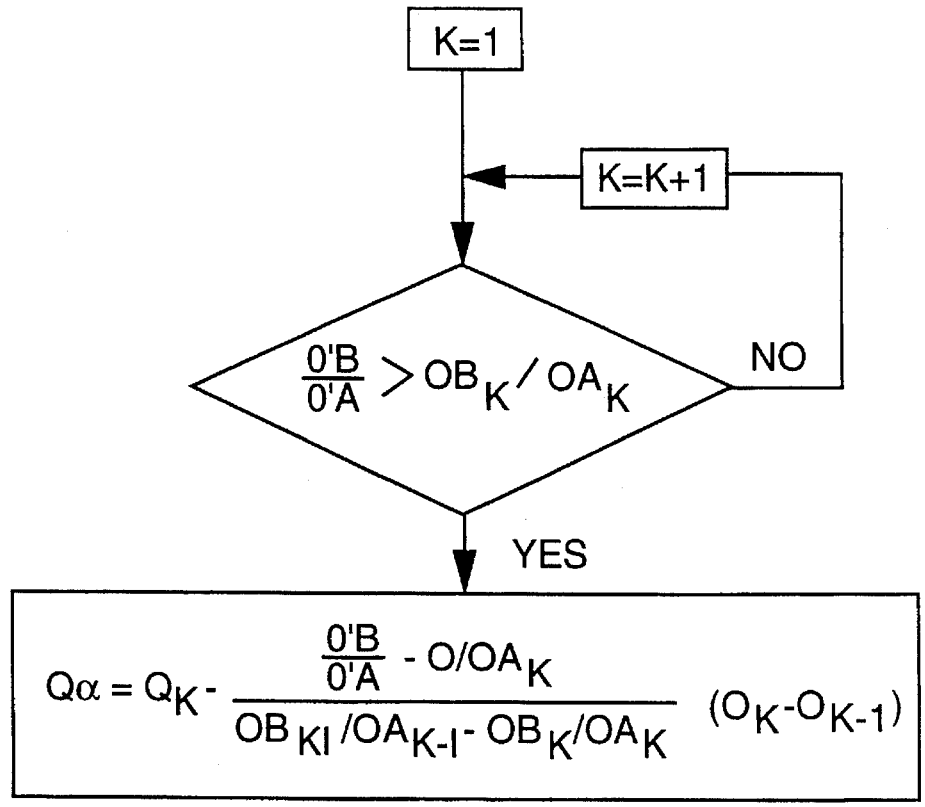
FIG. 30A is a flowchart indicative of the process for obtaining a flow from an output ratio.

In order to perform the calculation, the curves of FIGS. 1 and 2A are required to be reproduced approximately from data on the coordinates by linear interpolation (which includes connection of dots by straight line segments). FIG. 30A shows one example of an algorithm which performs the calculation by linear interpolation.

FIG. 30A is a flowchart indicative of an algorithm which obtains a flow Qα from the output ratio O'B/O'A. In this case, it is assumed that reference data at several points are already recorded on the built-in ROM 11b.

Let the kth flow and the output ratio OB/OA at that time be $Q_k$ and $OB_k/O_k$, respectively.

Figure 30B:
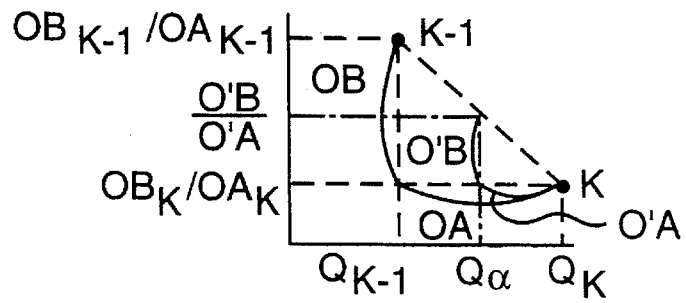
FIG. 30B shows linear interpolation.

When the answer is YES at a determining step for $O'B/O'A > OB_k/OA_k$ in the flowchart of FIG. 30A, the coordinates are in the positional relationship as shown in FIG. 30B.

The final processing expression of FIG. 30A is obtained from the relationship OA/OB=O'A/O'B.

Figure 31:
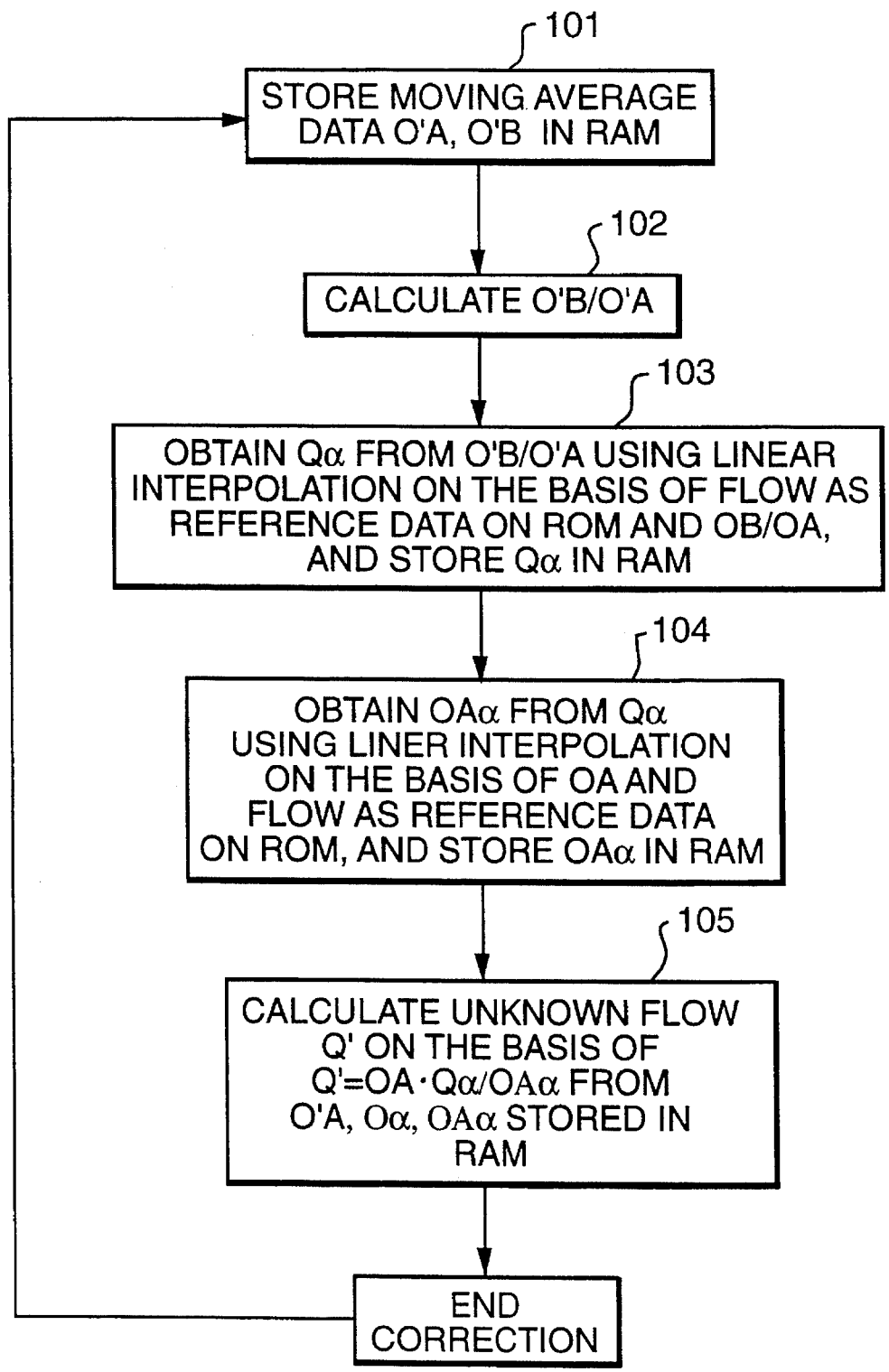
FIG. 31 is the basic flowchart indicative of the procedures of correction according to the present invention.

The basic flow of the proper correction procedures are steps 101–105 of FIG. 31, the details of which will be obvious from the above description. The program 14 for this processing is beforehand stored in the built-in ROM 11b of FIG. 24.

In FIG. 24, the RAM 11a and ROM 11b are not necessarily required to be built in the microprocessor 11c, but may be provided outside the microprocessor 11c.

Step (4): The result of the calculation is converted by the D/A converter 11d to an analog value, which is then converted by a V/I converter 11e to an analog current output of 4–20 mA.

When the instrumentation-ascribable errors were obtained at several points of flows Q', using this method, relatively small values were obtained to thereby confirm the practicality of this measuring method.

According to the present embodiment, different magnetic flux density distributions BA and BB were generated by using a flowmeter which is substantially the same in function as the known electromagnetic flowmeters and using selectively the two excitation coils. The flow in the non-full state was also measured on the basis of the outputs OA and OB which were obtained from the magnetic densities BA and BB.

Thus, the structure of the hardware is not especially complicated as compared to the conventional electromagnetic flowmeter. In addition, direct level measurement is not required, so that the flow measurement is not adversely affected by waves and voids on a surface of the flow of the fluid. Like the conventional well-known electromagnetic flowmeters, the flowmeter causes no damage to the conduit.

According to the flowmeter of the embodiment, the flow can be measured with high accuracy without being adversely affected by a slope of the conduit. Furthermore, the flow can be measured with high accuracy in the full fluid state like in the conventional full-fluid type electromagnetic flowmeter.

Embodiment 3

Figure 32:
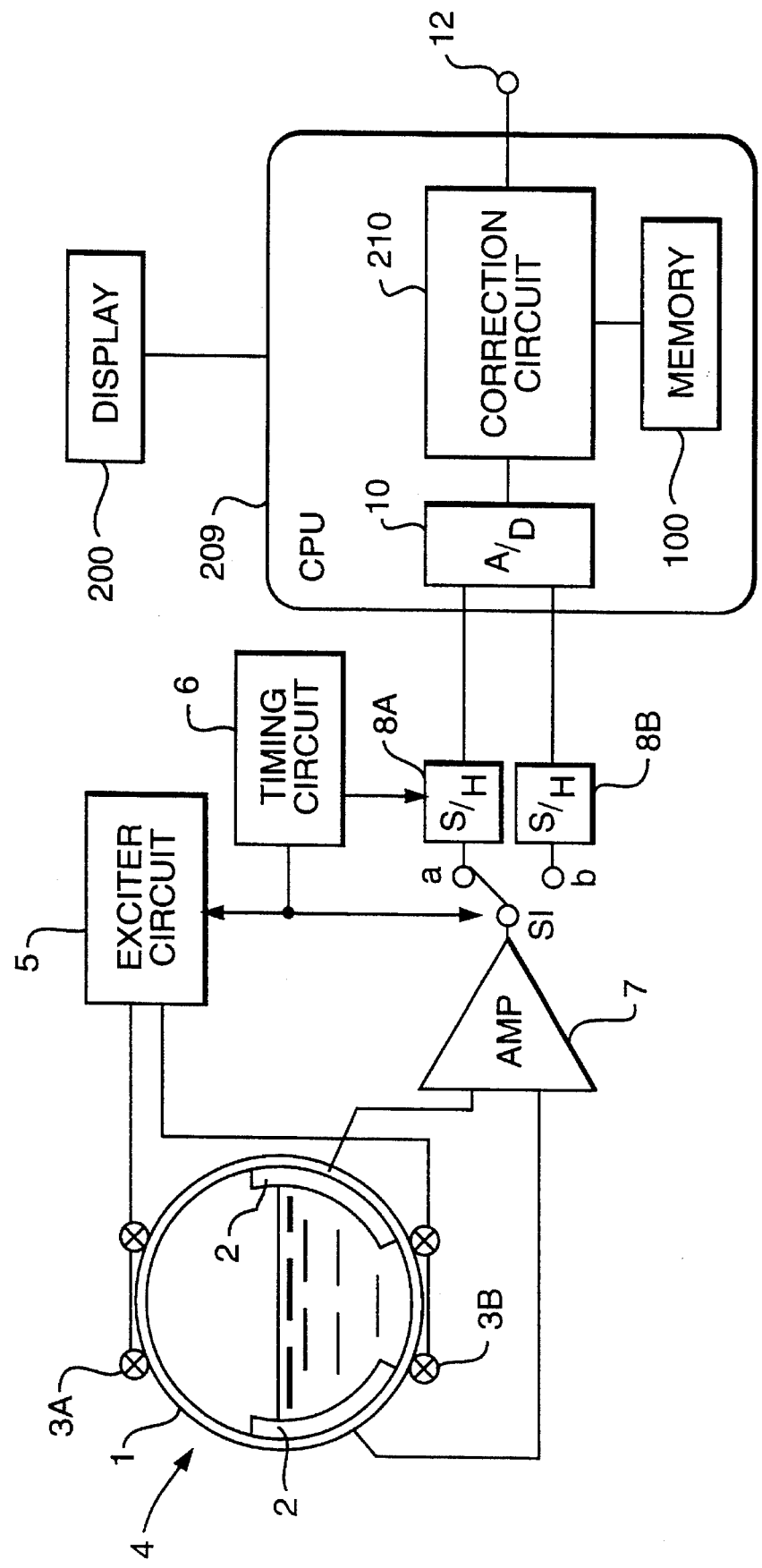
FIG. 32 shows a block diagram indicative of a third embodiment of an electromagnetic flowmeter according to the present invention.

An arrangement of the apparatus according to the instant embodiment is shown in FIG. 32. In the figure, the same parts or equivalent to those shown in FIG. 16 are denoted by like reference symbols. Repeated description thereof will thus be unnecessary.

According to the teachings of the present invention incarnated in the instant embodiment, data of the relations illustrated in FIGS. 1 and 2A obtained when the reference conduit is disposed at slopes of 2/1000 and 6/1000, respectively, are previously determined and stored in a memory 100. On the other hand, the slope ρ of the conduit being monitored as determined in accordance with the expression (8) is generated on the display device 200.

Operation of the apparatus according to the instant embodiment will now be described by referring to a flowchart shown in FIG. 33.

Figure 33:
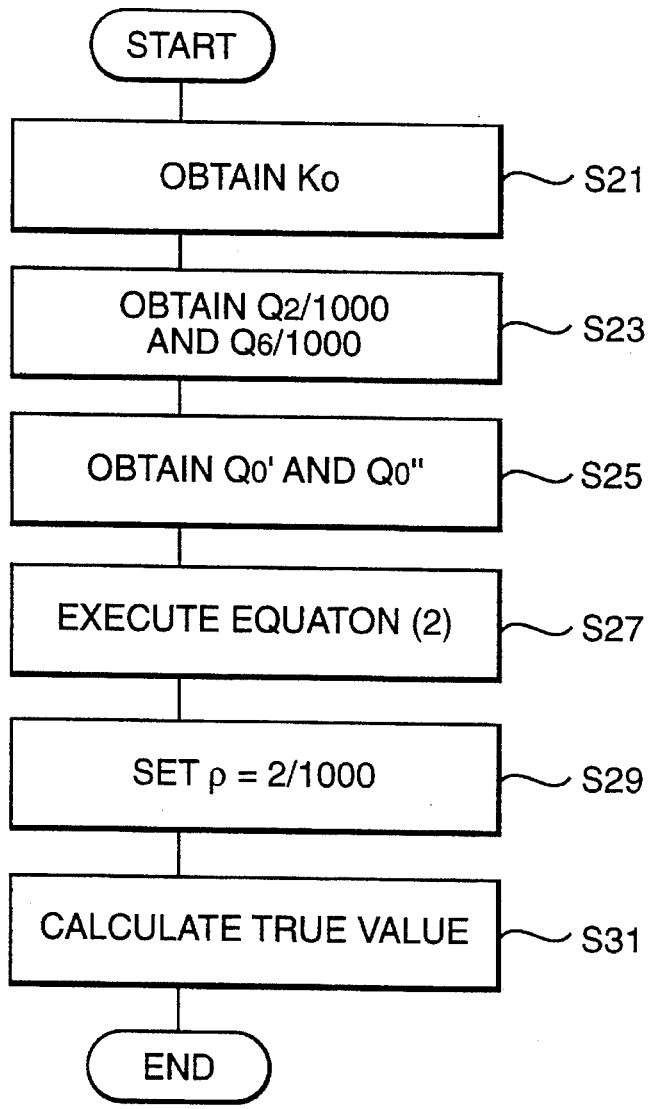
FIG. 33 shows a flowchart indicative of the operation of the third embodiment of the electromagnetic flowmeter.

Referring to FIG. 33, in a step 21, a ratio $K_0(=OB/OA)$ between output voltages OA and OB of the amplifier 7 is determined. Arithmetic determination of this ratio is executed by a correcting circuit 210 to which a CPU (Central Processing Unit) 209 is designated.

Next, in a step 23, the circuit 210 reads out the data of relations at the slopes of 2/1000 and 6/1000 from the memory 100 containing the data illustrated in FIG. 2A to thereby determine flow rates $Q_{2/1000}$ and $Q_{6/1000}$ corresponding to the ratio $P_0$ determined in the step 21, the flow rates being stored in registers (not shown).

In a step 25, the circuit 210 reads out the data of relation illustrated in FIG. 1 from the memory 100 to thereby calculate the sensitivity on the basis of the characteristic curve OA and determine the tentative flow rates Q' (2/1000) and Q" (6/1000), respectively, in accordance with the expression (6), which are stored in registers (not shown) as the tentative flow rate.

In a step 27, the flow rates $Q_{2/1000}$ and $Q_{6/1000}$ determined in the step 23 and the tentative flow rates Q' (2/1000) and Q" (6/1000) are placed in the expression (8) to thereby determine arithmetically the slope ρ of the conduit being monitored. The arithmetic operation to this end is carried out by the circuit 210. The results of the arithmetic determination are displaced on the display device 200. In the case of the instant embodiment, the slope ρ is found approximately equal to "0/1000".

In a step 29, the operator selects the slope of "2/1000" close to the above-mentioned slope of "ρ≈0/1000" (step 31). The method of calculation to this end is similar to that in the preceding embodiment. Parenthetically, the tentative flow rate Q' (2/1000) is adopted as the true flow rate in the case of the instant embodiment.

Figure 34:
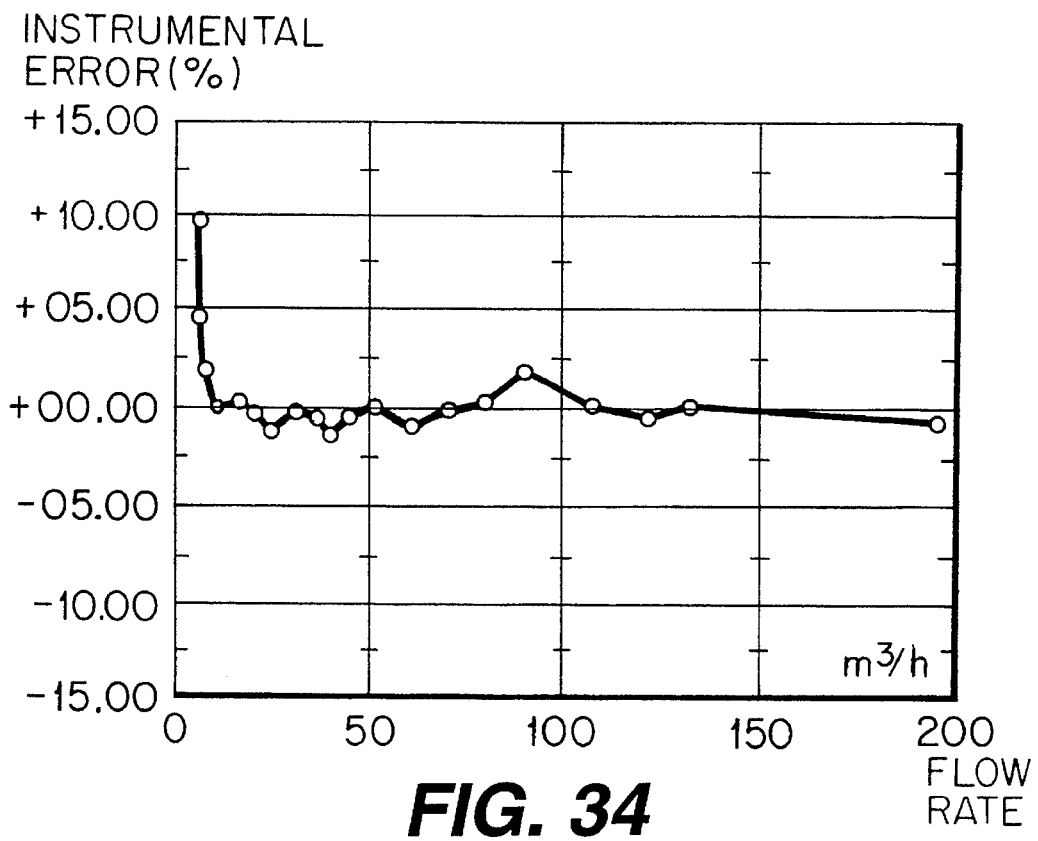
FIGS. 34 shows a graph indicative of instrumental error according to the embodiment.
Figure 35:
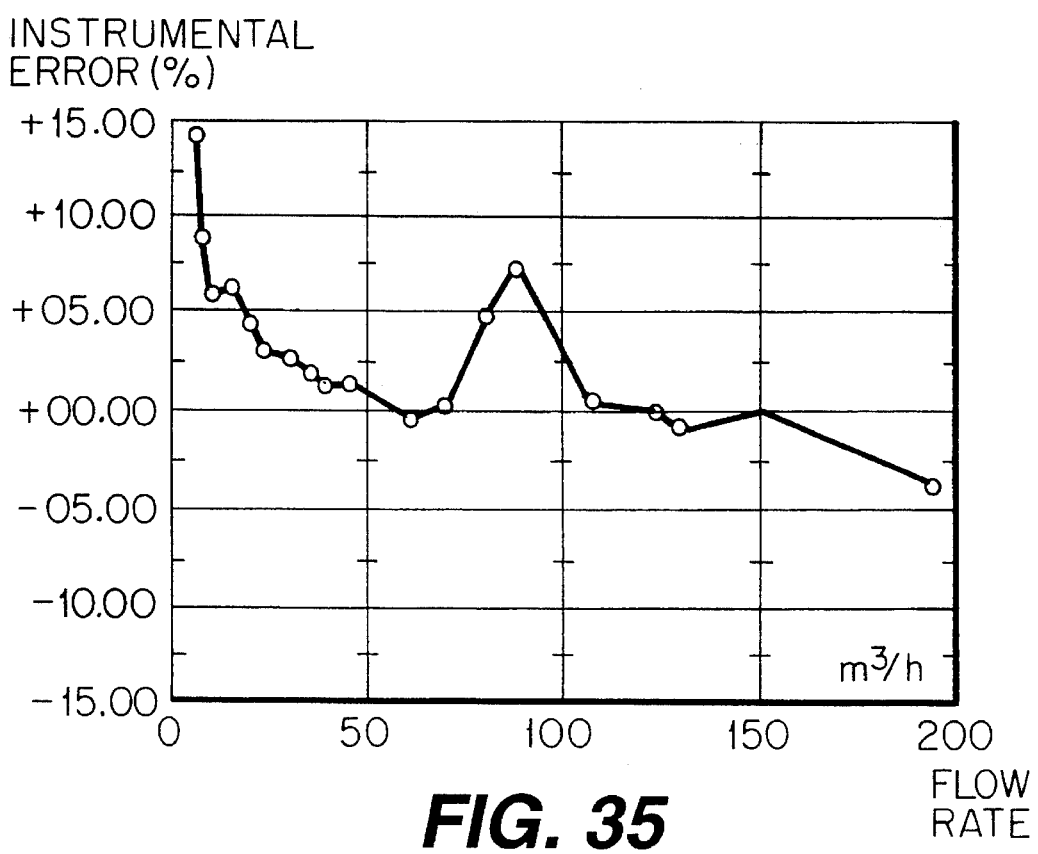
FIG. 35 shows a graph indicative of instrumental error according to a comparative embodiment.

In the mode for carrying out the instant embodiment, the actual slope ρ of the conduit is "0/1000". In that case, an instrumentation-ascribable error curve determined in the measurement based on the selected slope data "2/1000" is illustrated in FIG. 34. Parenthetically, it should be mentioned that the instrumentation-ascribable error is replaced by "((measured value–true value)/true value×100 (%))". The true value is obtained as the output of the reference or standard flow meter. In this conjunction. FIG. 35 illustrates an instrumentation-ascribable error curve measured on the basis of the data when the slope is "6/1000".

Comparison between FIGS. 34 and 35 shows that the flow rate can be measured with high accuracy in accordance with the teachings of the invention as shown in the instant embodiment.

It should incidentally be added that the inner diameter of the conduit is 240 mm.

Each of the electrodes 2 has a width of 40 mm as viewed across the flowing direction and a thickness of 2 mm, wherein both electrodes are disposed with an angle P of 90° therebetween.

Figure 36:
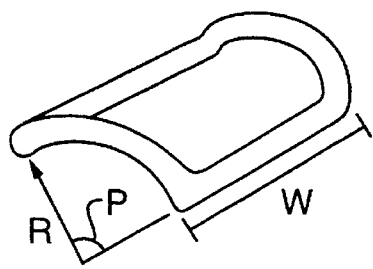
FIG. 36 is a perspective view of a coil used in the embodiment.

Exemplary sizes R 134 mm and W 236 mm and configurations of the upper and lower coils are illustrated in FIG. 36 on the assumption that the coil has 1300 turns.

Embodiment 4

Figure 37:
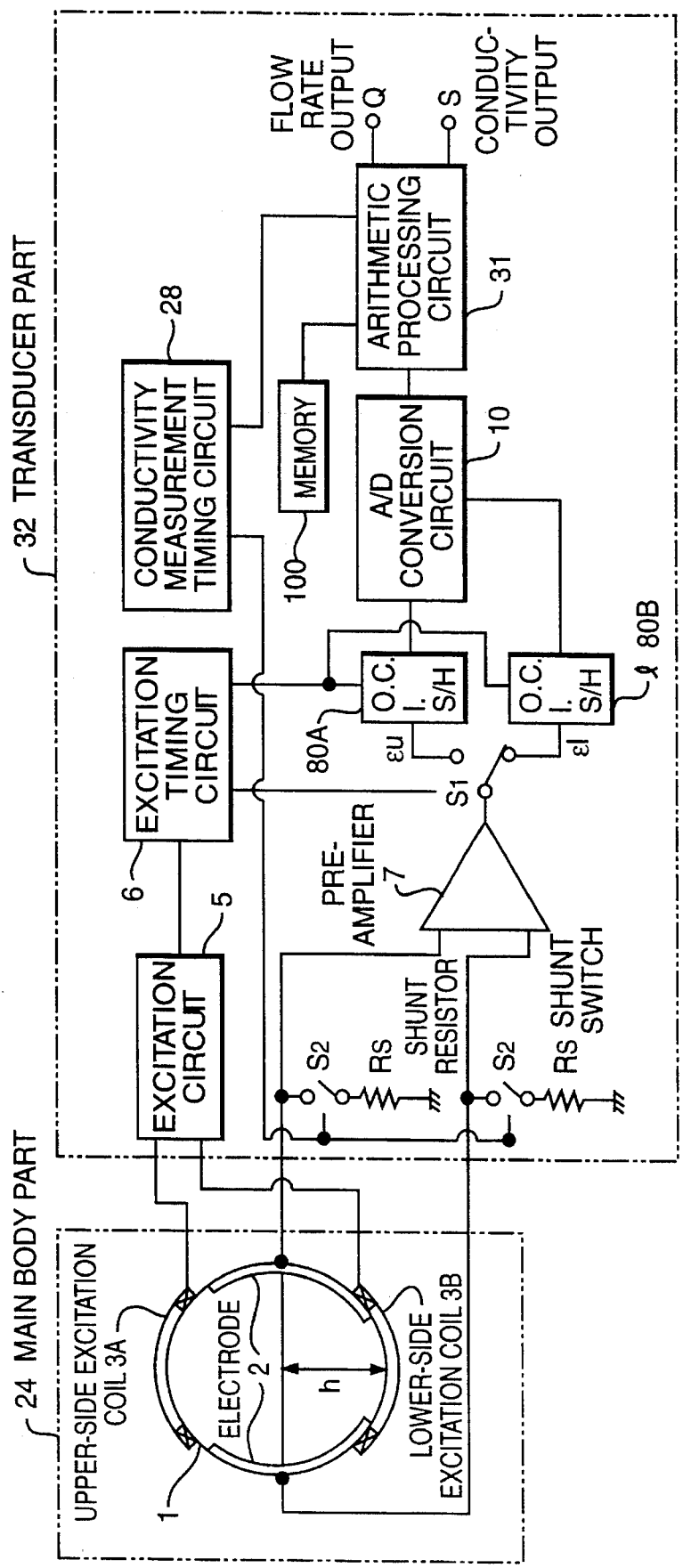
FIG. 37 shows a block diagram indicative of a fourth embodiment of an electromagnetic flowmeter according to the present invention.
Figure 38:
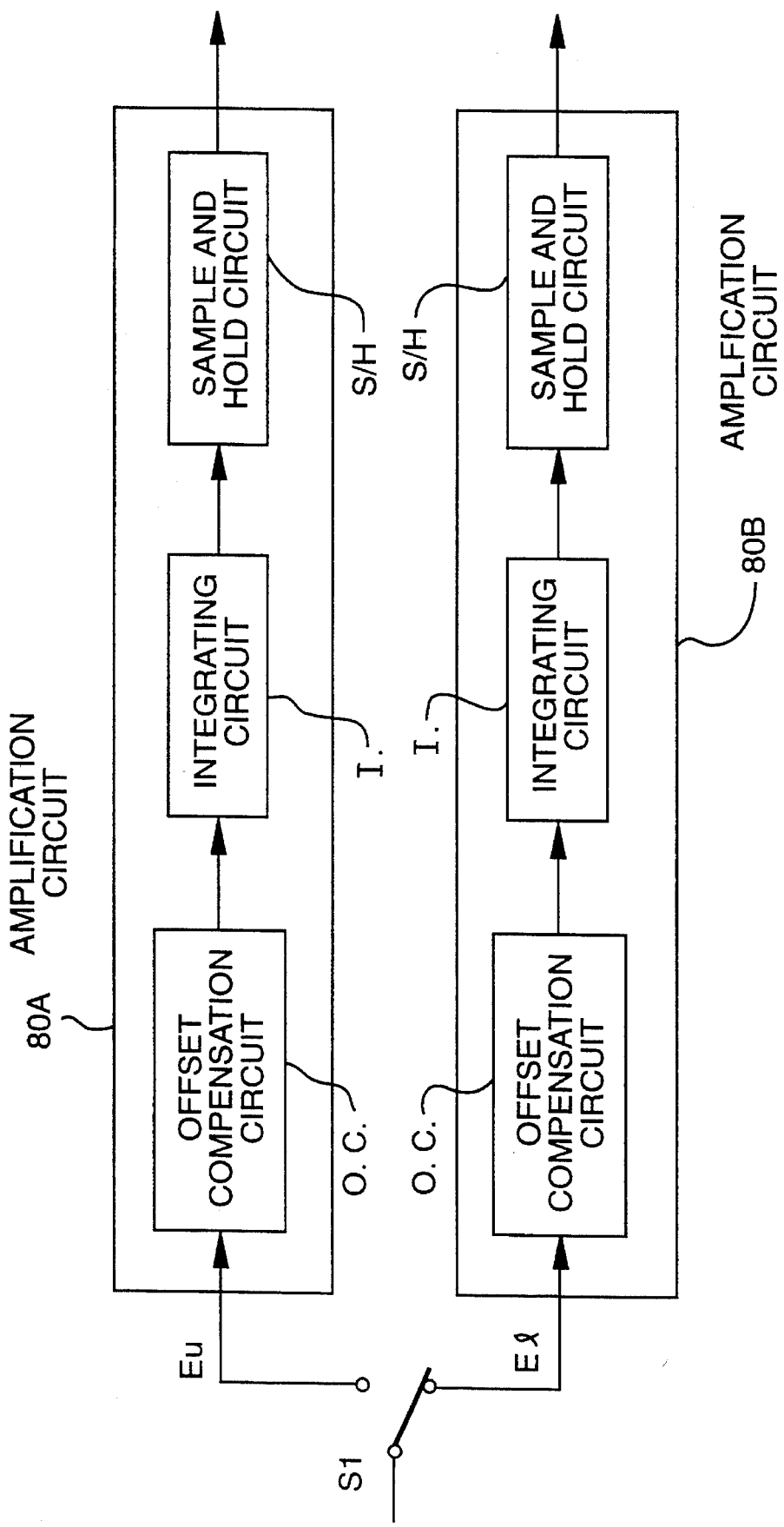
FIG. 38 is a view showing a part of FIG. 37 in detail.

FIG. 37 shows a structure of the flow meter according to a fourth embodiment of the present invention. In this figure, the same parts or equivalent to those shown in FIG. 16 are denoted by like reference symbols and repeated description thereof is omitted. FIG. 38 shows in detail configurations of the amplifier circuits 80A and 80B.

The flow meter according to the instant embodiment is comprised of a main body part 24 and a transducer part 32, wherein the main body part 24 is implemented in the same structure as that shown in FIG. 16. On the other hand, the transducer part 32 includes an electrical conductivity measurement timing control circuit 28 as a second timing circuit, herein the timing control circuit 28 is arranged to generate a timing signal for controlling the closing/opening (on/off) of a shunt switch S2 and supplying the timing to an arithmetic processing part 31. The shunt switch S2 is interposed between a lead extending from the electrode 2 to a preamplifier 7 and a shunt resistor $R_S$ having one end connected to the ground potential.

Figure 39:
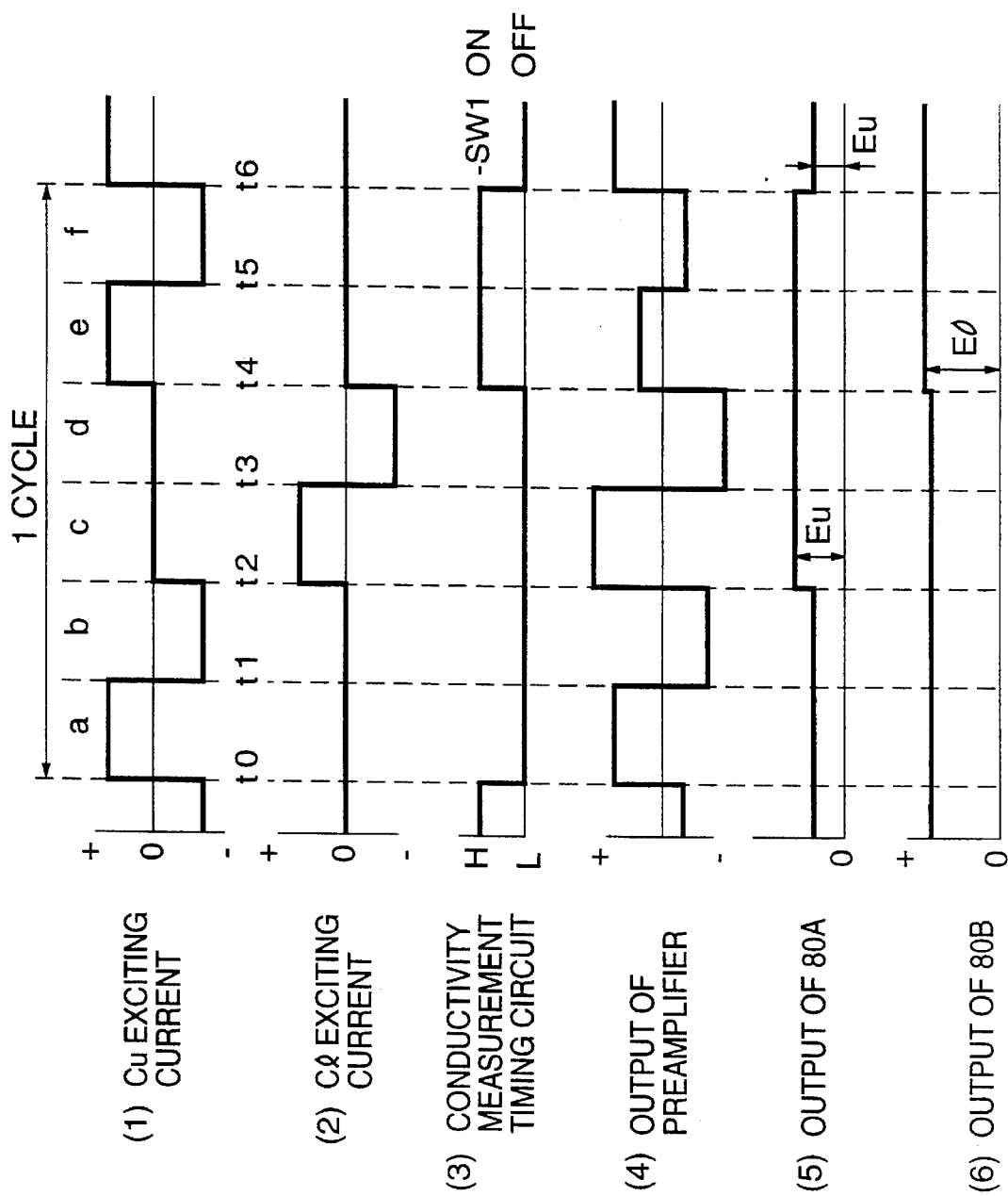
FIG. 39 is a timing chart of the flowmeter.

FIG. 39 illustrates a typical timing for one cycle of measurement. In the figure, one cycle of measurement includes periods a to f.

(i) The upper coil 3A is electrically energized or excited during the periods a and b and the periods e and f.

(ii) The lower coil 3B is electrically energized or excited during periods c and d.

(iii) The shunt switch S2 is closed only during the periods e and f.

(iv) The output of the preamplifier 7 changes in response to excitations of the coils and the on/off operation of the shunt switch.

(v) The amplification circuit 80A serves to integrate the output of the preamplifier 7 during the period in which the upper coil 3A is excited, hold the integral value upon completion of the integration and output the integral value. Consequently, the integral values determined over the periods a and b are determined at a time point $t_2$ while integral values over the periods a and f are determined at a time point $t_6$.

Figure 11:
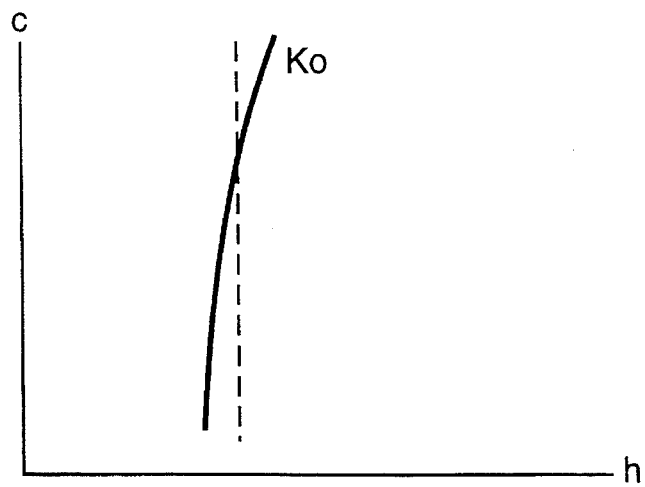
FIG. 11 shows a view showing a curve ($K_0$) on a (h—c) plane.
Figure 12:
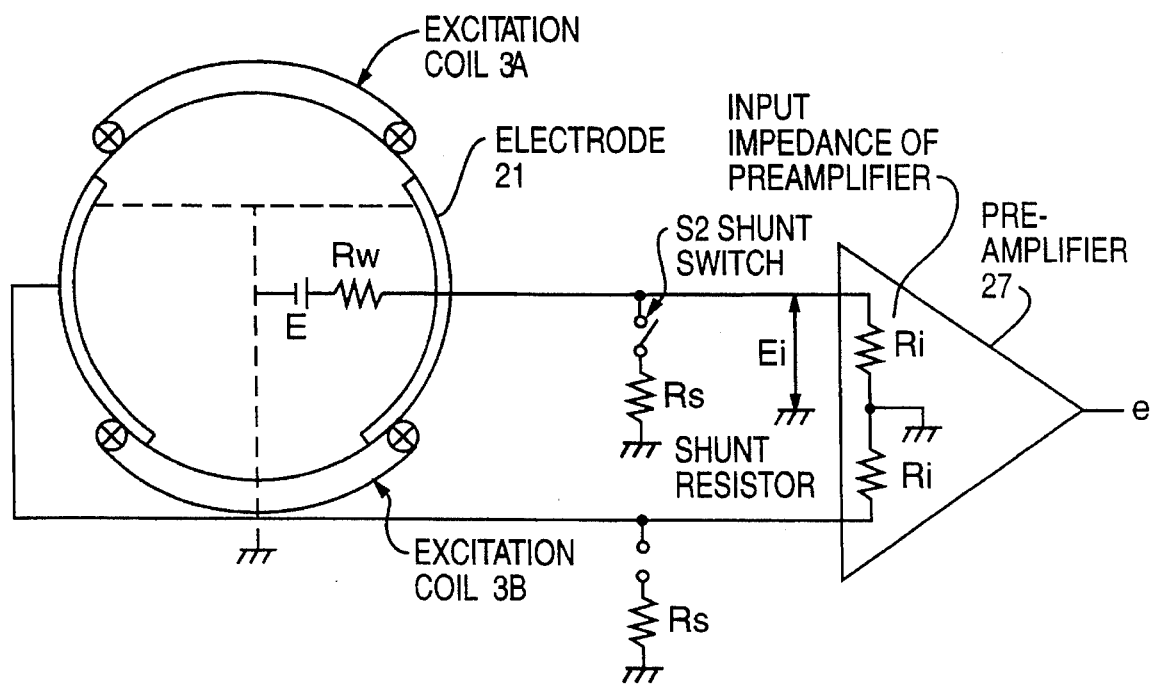
FIG. 12 shows a major portion of an electric circuit according to one aspect of the present invention.
Figure 13:
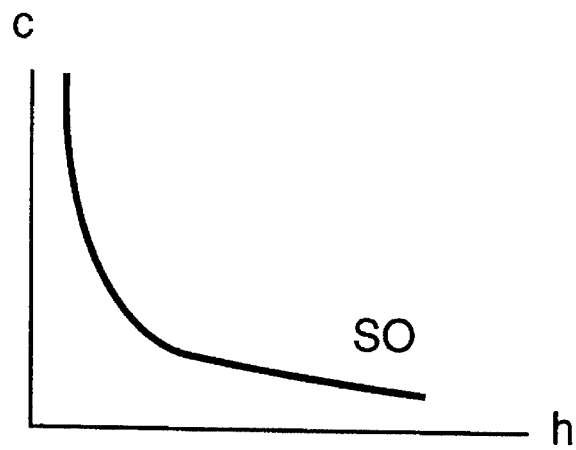
FIG. 13 shows a view showing a curve ($s_0$) on the (h—c) plane.
Figure 14:
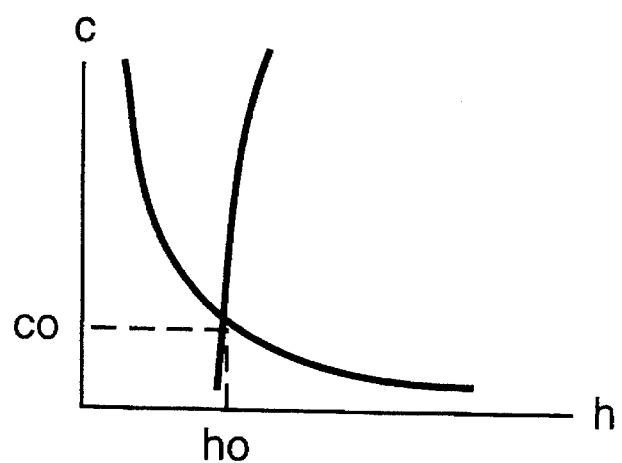
FIG. 14 shows a view showing intersection of the curves ($K_0$) and ($s_0$) on the (h—c) plane.
Figure 40:
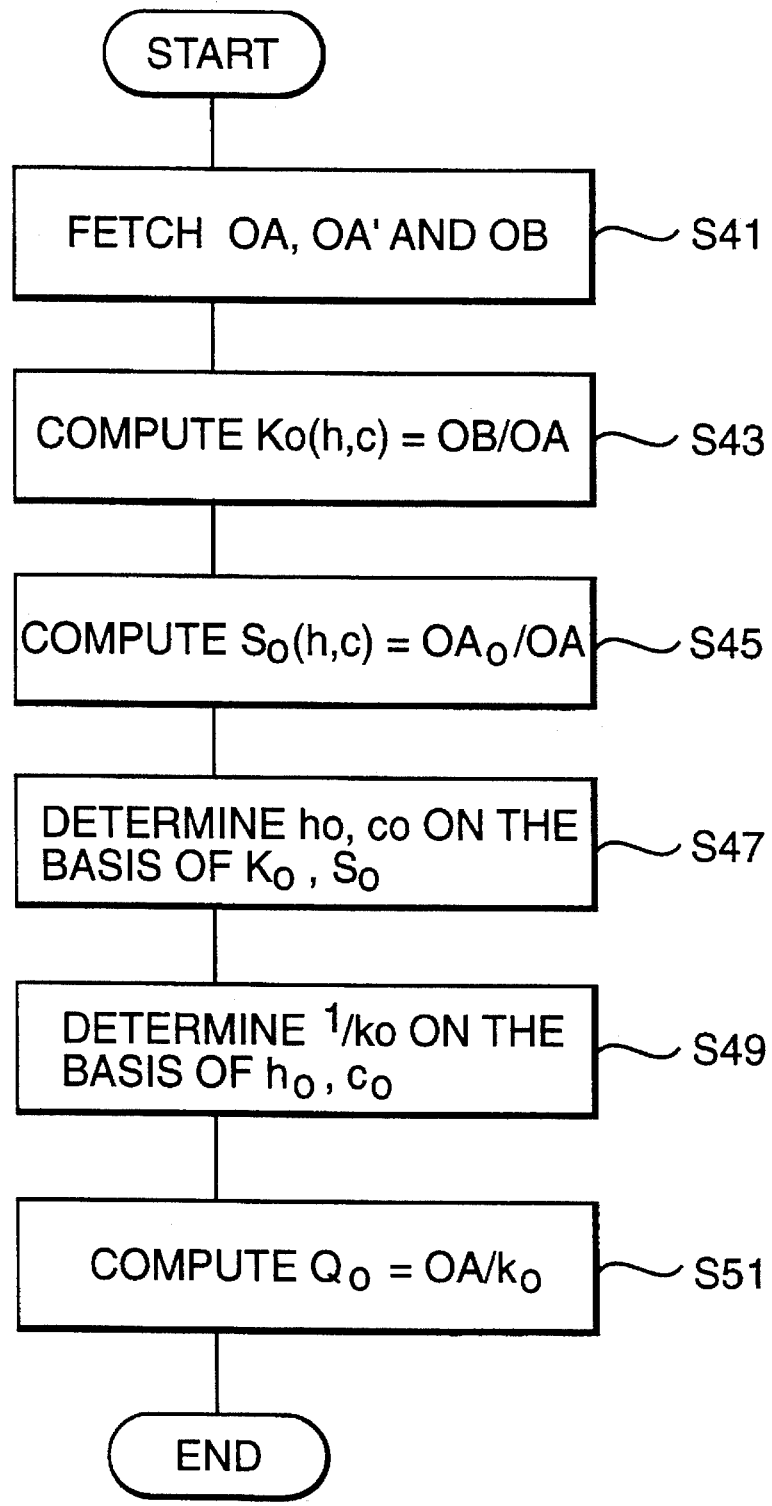
FIG. 40 shows a flowchart indicative of the operation of the flowmeter.
Figure 41:
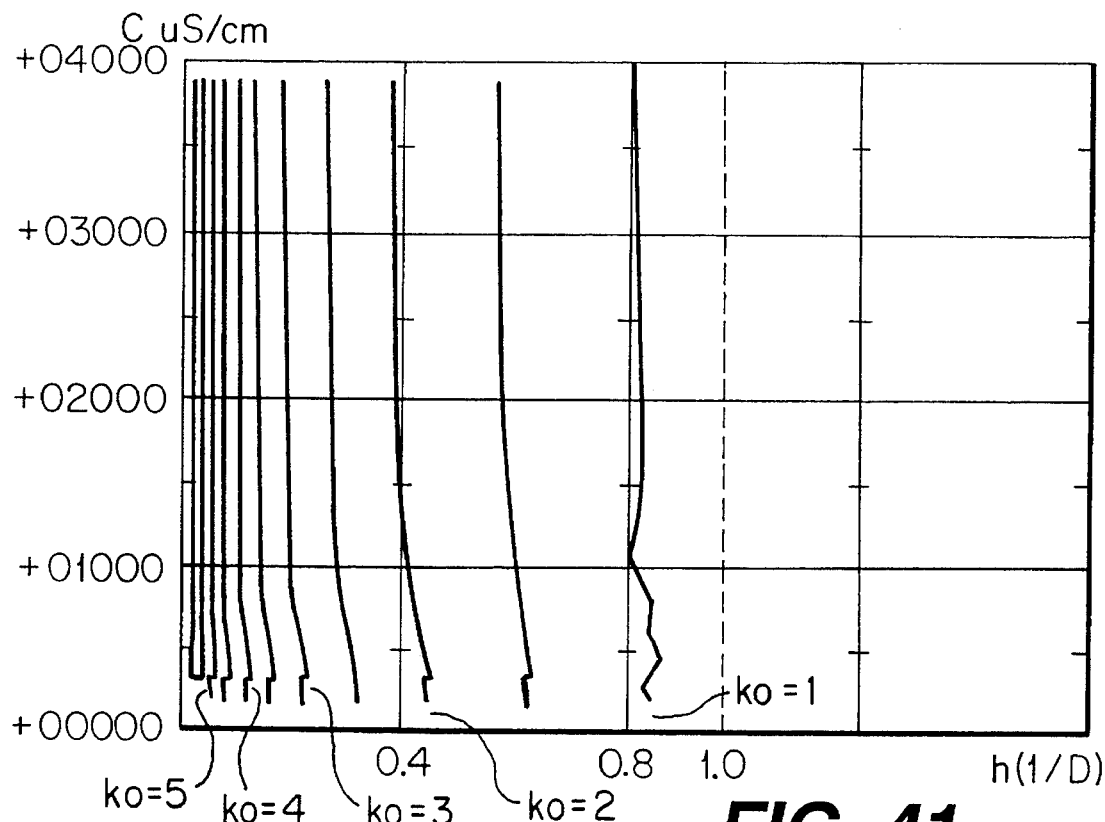
FIG. 41 is a view showing a curve ($K_0$) on a (h—c) plane according to the fourth embodiment of the invention.
Figure 42:
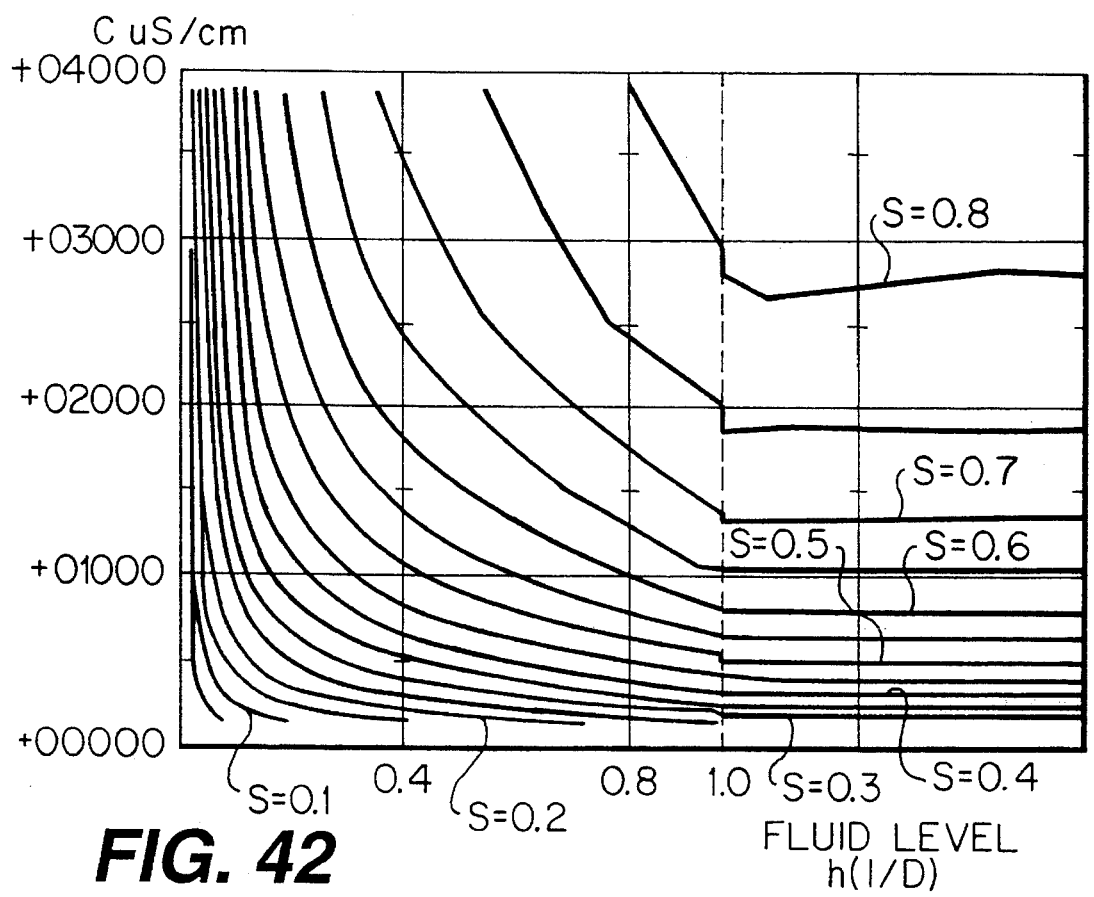
FIG. 42 is a view showing a curve ($s_0$) on a (h—c) plane according to the fourth embodiment of the invention.
Figure 43:
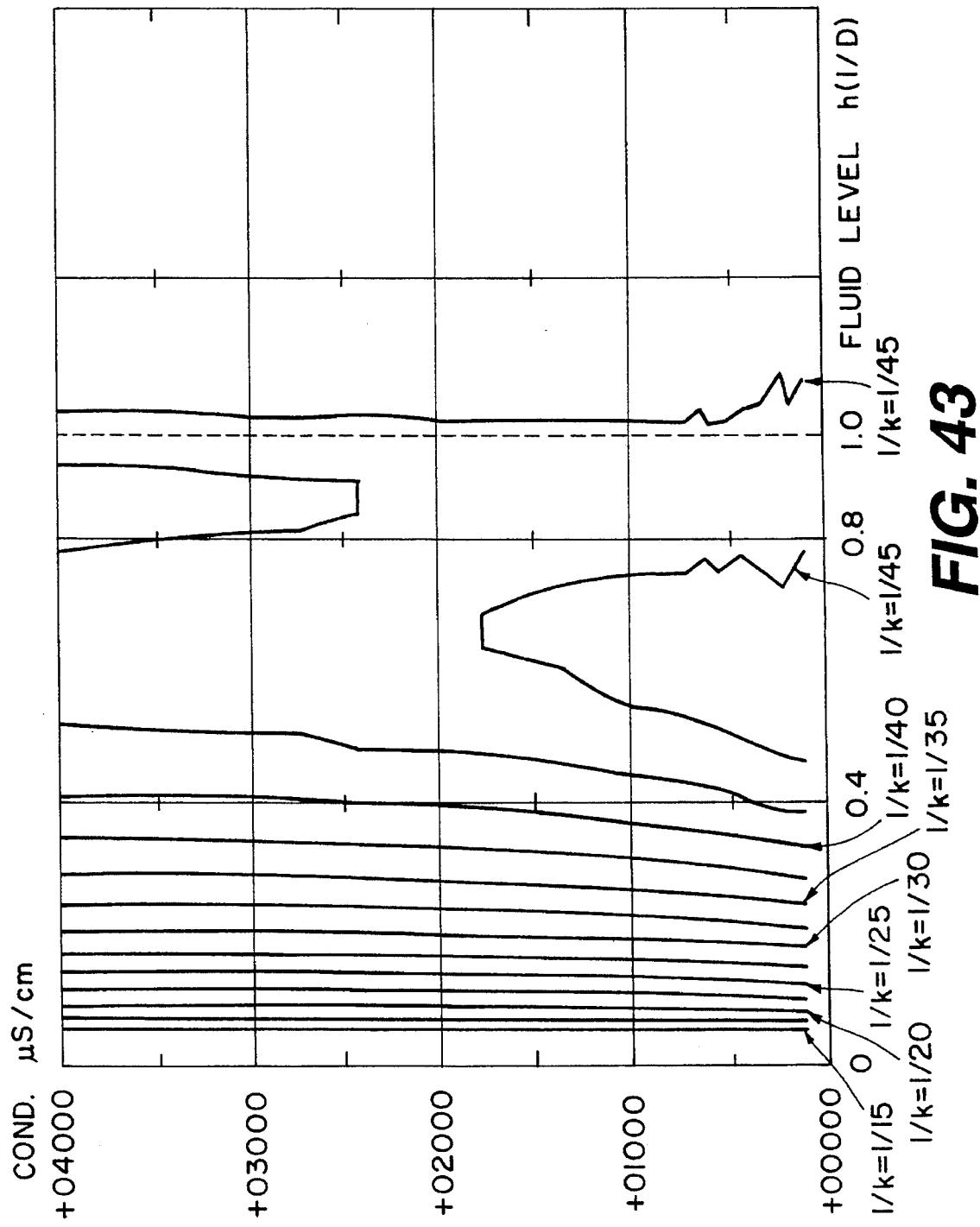
FIG. 43 is a view showing relation between (g), (h) and (c).

Processing of the data obtained in this way will be described by reference to a flowchart of FIG. 40. FIG. 41 shows a view of projection of a function of the output ratio "$K_0$=OB/OA", fluid level and the electrical conductivity onto a plane of the fluid level and the electrical conductivity, the data has previously been prepared by using the reference conduit. This figure corresponds to FIG. 11. Similarly, FIG. 42 is a view corresponding to FIG. 13. FIG. 43 also shows a projection of a function of a reciprocal of the sensitivity (i.e. 1/k), fluid level and the electrical conductivity onto a plane of the fluid level and the electrical conductivity, which data have previously been prepared for the reference conduit. The functions shown in FIGS. 41 to 43 are stored beforehand in a memory 100 serving as a storage means. In this conjunction, it should be mentioned that the inner diameter of the reference conduit used for deriving the functions shown in FIGS. 41 to 43 was 200 mm. Further, the shunt resistor Rs was 100 Ω, and the input impedance of the preamplifier 27 was 100 MΩ.

Now, in a step 41, the output OA generated when the upper coil 3A is excited with the shunt switch S2 opened, the output $OA_0$ generated when the shunt switch S2 is closed and the output OB generated when the lower coil 3B is exited with the shunt switch S2 opened are detected and saved or hold in a register incorporated in the arithmetic processing module 31.

In a step 43, an arithmetic circuit of the arithmetic processing module 31 reads out the data OA and OB to thereby determine the ratio $K_0$ (h, c)=OB/OA, the result of this arithmetic operation being stored in a register.

Similarly, in a step 45, a ratio $s_0$ (h, c)=$OA_0$/OA is arithmetically determined, and the result is stored in a register.

In a step 47, the value $K_0$ (h, c) obtained in the step 43 is compared with the data of FIG. 41 stored in the memory 100 to thereby select the data which bears the closest relevance to the ratio $K_0$ (h, c). On the other hand, the value of $s_0$ (h, c) obtained in the step 45 is compared with the data of FIG. 42 stored in the memory 100 to thereby select the data closest to the ratio $s_0$ (h, c). On the basis of intersection between the two data obtained in this way, the level $h_0$ and the electrical conductivity $c_0$ of a fluid flowing through the conduit being monitored can be identified or determined.

In the step 49, the data of FIG. 43 stored in the memory 100 is referenced for thereby determining a reciprocal $1/k_0$ of the sensitivity corresponding to the fluid level $h_0$ and the conductivity $c_o$ identified in the step 47.

In the step 51, the data OA is read out from the register, while the reciprocal $1/k_0$ obtained in the step 49 is placed in the expression (11) for calculating the flow rate $Q_0$.

Figure 44:
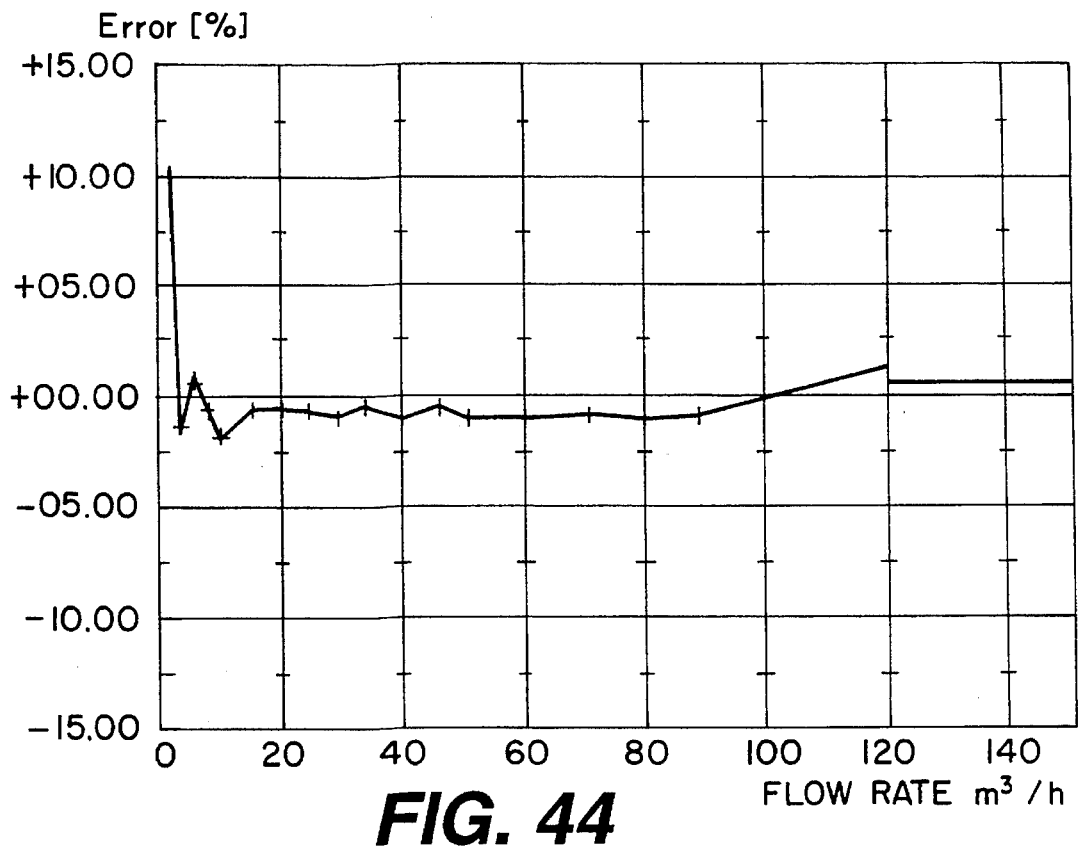
FIG. 44 shows a graph indicative of instrumental error according to the embodiment.
Figure 46:
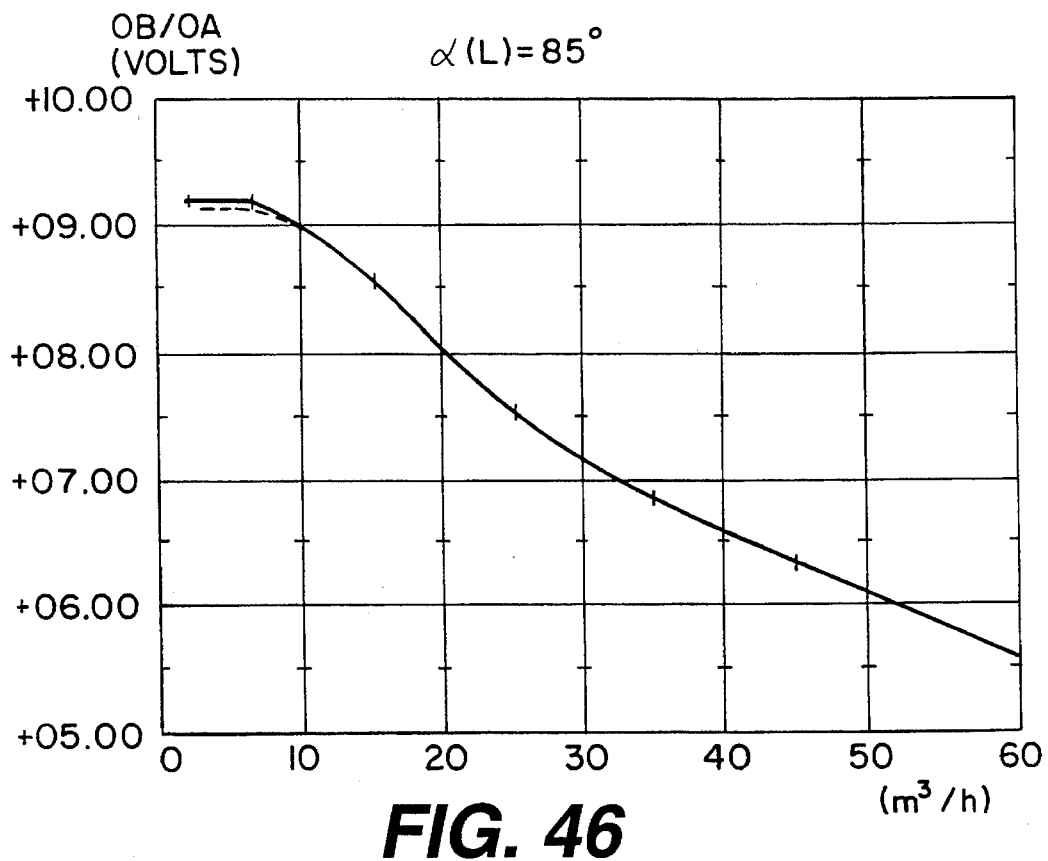
FIG. 46 illustrates the relation between ratio OB/OA and flow rate where a central angle $\alpha(L)$ of lower portion of sensor electrodes is 85 degrees.

FIG. 44 shows instrumentation-ascribable error in the flow measurement of a fluid having an electrical conductivity of 1300 μS/cm in accordance with the method of the instant embodiment. On the other hand, FIG. 46 shows instrumentation-ascribable error in the flow rate measurement of the same fluid according to the method described hereinbefore in conjunction with the first embodiment. City water was used as the fluid caused to flow through the reference conduit.

Figure 45:
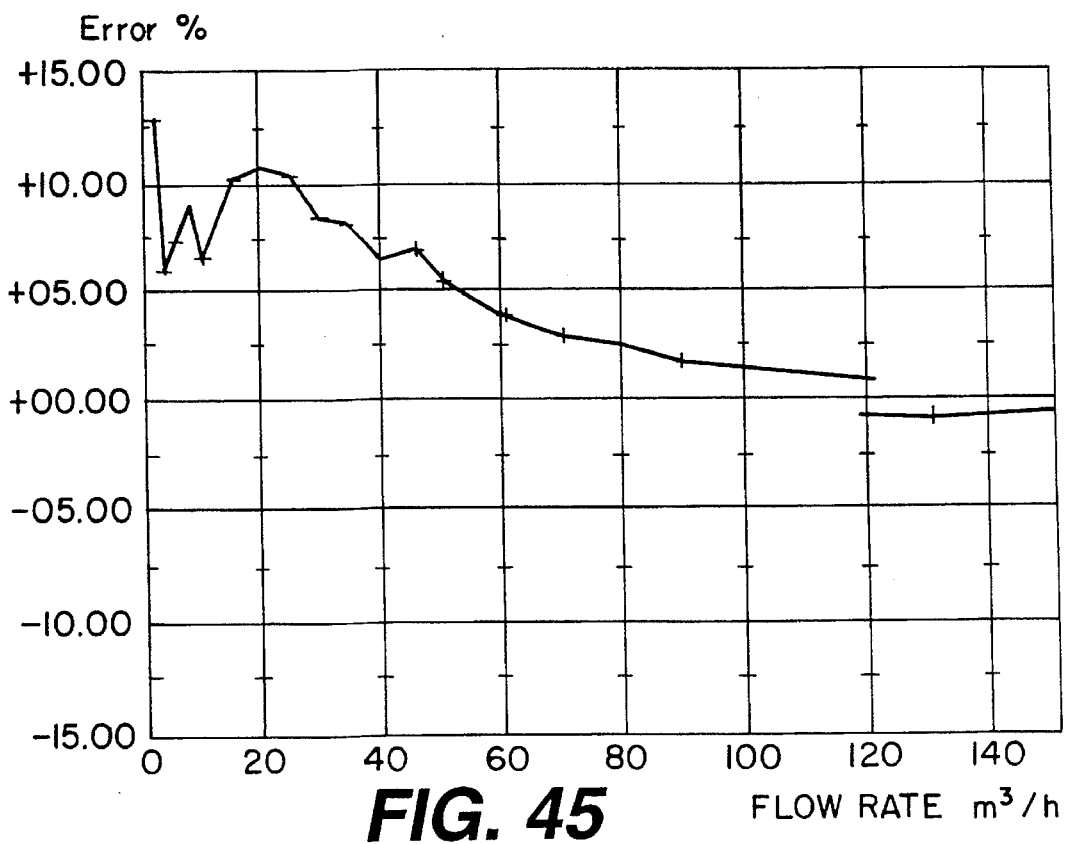
FIG. 45 shows a graph indicative of instrumental error according to an comparative embodiment.

Comparison between the data of FIGS. 44 and 45 shows that the flow rate can be measured with high accuracy according to the instant embodiment even in the case where the fluid flowing through the conduit under monitor differs significantly from that of the fluid flowing through the reference conduit.

The function $s_0$ (h, c)=$OA_0$/OA is utilized in the current embodiment, another function indicative of $s_0$ (h, c)=($OA_0$+$OB_0$)/(OA+OB), where $OB_0$ is an output when the lower coil is excited while the shunt switch s2 is closed, can also utilized.

Embodiment 5

Figure 48:
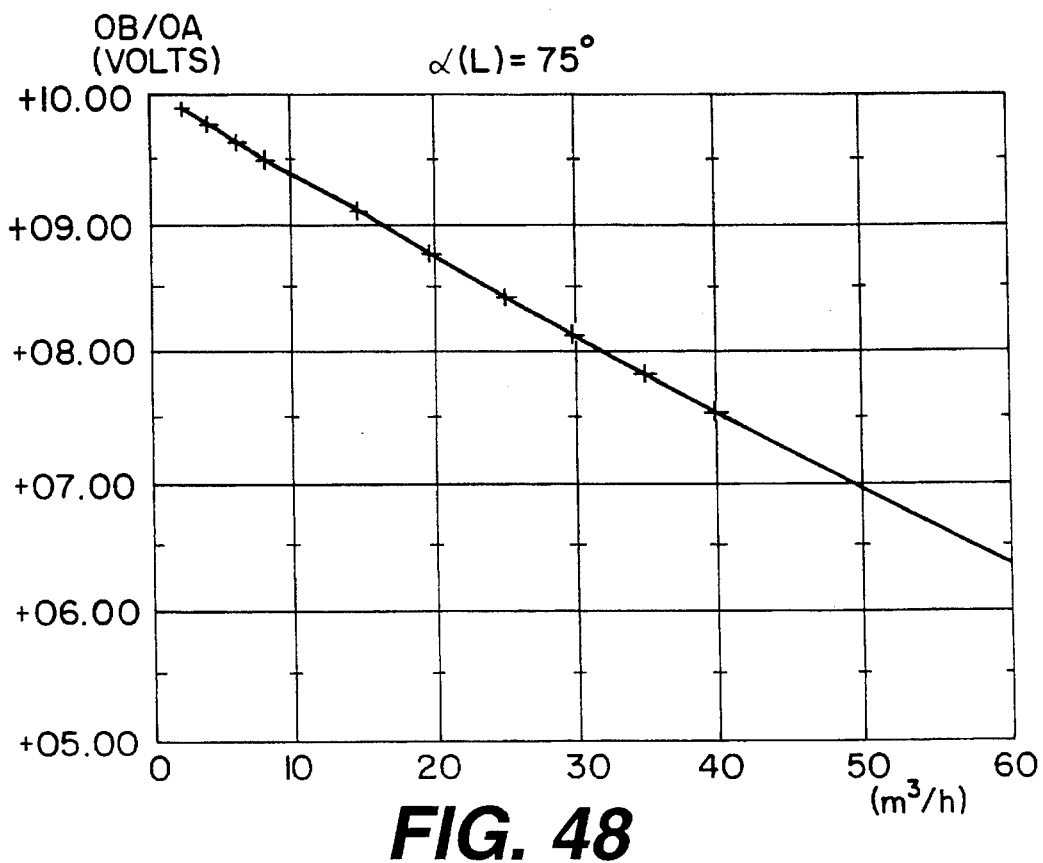
FIG. 48 illustrates the relation between ratio OB/OA and flow rate where the central angle $\alpha(L)$ of lower portion of the sensor electrodes is 75 degrees.

The current embodiment concerns a pair of electrodes 2. The electrodes 2 are asymmetrical around a horizontal axis (radius) of the conduit 1. The central angle α (L) of respective portions of the electrodes which are positioned below the horizontal axis is preferably 50–80 degrees. If the angle exceeds 80 degrees, the ratio OB/OA does not fully respond to variation in flow rate Q where the flow rate is low (where the flow rate is lower than about 6 m$^2$/h; refer to FIG. 46). That is, the sensitivity of the ratio OB/OA to the flow rate becomes substantially zero. To the contrary, the smaller the central angle α (L), the greater the sensitivity of an output OA to the flow rate and also the smaller influence of conductivity of a fluid as shown in FIG. 47 and it is quite preferable. However, when the central angle α (L) is 55 degrees, it is not possible to measure the flow late lower than 10 m$^3$/h because, as shown in FIG. 6a, the fluid having a low level is not detected by such electrodes with smaller central angle. It has been experimentally established by the inventor of the present application that the central angle α (L) is preferably larger than 50 degrees. In the current embodiment, the central angle α (L) is set to 75 degrees because at such angle the sensitivity of the ratio OB/OA to the flow rate Q is available even if the flow rate is very low while obtaining enough sensitivity in all area where the flow rate can be measured. FIG. 48 illustrates the relationship between the ratio OB/OA and the flow rate where the central angle α (L) is 75 degrees. It should be noted that the data in FIGS. 46–48 are obtained by utilizing the experimental device shown in FIG. 18.

The central angle α (U) of respective portions of the electrodes which are positioned above the horizontal axis is preferably 30–40 degrees. It has been experimentally established by the present inventor that the curve OA in FIG. 1 becomes straight when the central angle α (U) is kept at 30–40 degrees. As the curve OA is closer to a straight line, the sensitivity k changes linearly with respect to a change in the level or flow rate of the fluid. In the current embodiment, the central angle α (U)=35 degrees.

The present invention has been described in detail, it should be understood that various changes, substitutions and alterations can be made hereto without departing from the spirit and scope of the present invention as defined by the appended claims.

We claim:

1. An electromagnetic apparatus for a flow-meter usable for measuring the flow of a fluid in a conduit which is at least partially filled with fluid, comprising:

a first coil for applying a first magnetic field to said conduit;

a second coil for applying a second magnetic field to said conduit;

a pair of electrodes attached to a side wall of said conduit and responsive to said first and second magnetic fields; and means for alternately energizing one of said first and second coils.

2. An apparatus according to claim 1, wherein each of said electrodes comprises a first portion extending upwardly from a horizontal radius of said conduit and forming therewith a central angle of substantially 30–40 degrees, defined between said horizontal radius and a further radius rotated upwardly from horizontal radius to the end of the first portion and a second portion extending downwardly from the horizontal radius, said second portion being longer than the first portion.

3. An apparatus according to claim 2, wherein said central angle of said first portion is about 35 degrees.

4. An apparatus according to claim 2, wherein a central angle between said second portion and the horizontal radius, defined between said horizontal radius and a further radius rotated downwardly from said horizontal radius to the end of the second portion is from 50 to 80 degrees.

5. An apparatus according to claim 4, wherein said central angle of said second portion is about 75 degrees.

6. An apparatus according to claim 1, wherein said electrodes are attached to an inner surface of said side wall of said conduit.

7. An electrode flow meter which comprises an apparatus set forth in claim 2.

8. A sensor flow-meter usable with a conduit which is at least partly filled with a fluid, comprising:

a first coil for applying a first magnetic field to said conduit;

a second coil for applying a second magnetic field to said conduit;

a pair of electrodes attached to a side wall of said conduit and responsive to said first and second magnetic fields, each of said electrodes comprising a first portion extending upwardly from a horizontal radius of said conduit and a second portion extending downwardly from the horizontal radius, said second portion being longer than said first portion; and a switch for selectively activating one of said first and second coils.

9. A sensor according to claim 7, wherein a central angle formed between said horizontal radius and said first portion and defined between said horizontal radius and a further radius rotated upwardly from said horizontal radius to the end of said first portion, is from 30 to 40 degrees, and a relationship of each ratio OA/OB, OB/OA, OB/(OA+OB), OA/(OA+OB), (OA+OB)/OA and (OA+OB)/OB with respect to a flow rate of said fluid flowing in said conduit is substantially one-to-one, and wherein said OA represents an output voltage across said electrodes when said first coil is activated and said OB represents an output of said electrodes when said second coil is activated.

10. A sensor according to claim 8, wherein a central angle formed between the horizontal radius and the second portion and defined between said horizontal radius and a further radius rotated downwardly from said horizontal radius to the end of said second portion is from 50 to 80 degrees.

* * * * *